US011197047B2

(12) United States Patent
Kitts et al.

(10) Patent No.: US 11,197,047 B2
(45) Date of Patent: *Dec. 7, 2021

(54) SYSTEMS AND METHODS FOR OPTIMIZED DELIVERY OF TARGETED MEDIA

(71) Applicant: ADAP.TV, INC., Dulles, VA (US)

(72) Inventors: Brendan Kitts, Seattle, WA (US); Dyng Au, Seattle, WA (US); Jon Borchardt, Seattle, WA (US)

(73) Assignee: ADAP.TV, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,357

(22) Filed: Dec. 21, 2020

(65) Prior Publication Data

US 2021/0152864 A1 May 20, 2021

Related U.S. Application Data

(63) Continuation of application No. 16/733,777, filed on Jan. 3, 2020, now Pat. No. 10,911,808, which is a continuation of application No. 16/118,650, filed on Aug. 31, 2018, now Pat. No. 10,567,820, which is a continuation of application No. 14/817,990, filed on Aug. 4, 2015, now Pat. No. 10,104,411.

(Continued)

(51) Int. Cl.
*H04N 21/466* (2011.01)
*H04N 21/258* (2011.01)
(Continued)

(52) U.S. Cl.
CPC ....... *H04N 21/25883* (2013.01); *G06Q 30/02* (2013.01); *G06Q 30/0242* (2013.01);
(Continued)

(58) Field of Classification Search
CPC ............ H04N 21/812; H04N 21/2547; H04N 21/6582; H04N 21/4667; H04N 21/2407;
(Continued)

(56) References Cited

U.S. PATENT DOCUMENTS

| | | | |
|---|---|---|---|
| 6,029,176 A * | 2/2000 | Cannon | G06Q 30/02 |
| 6,286,005 B1 * | 9/2001 | Cannon | G06Q 30/02 |
| | | | 455/2.01 |

(Continued)

*Primary Examiner* — Nasser M Goodarzi
*Assistant Examiner* — Patrick A Ryan
(74) *Attorney, Agent, or Firm* — Bookoff McAndrews, PLLC

(57) ABSTRACT

Systems and methods are disclosed for targeting of advertising content for a consumer product, by obtaining consumer demographic data, the consumer demographic data including a plurality of demographic attributes for each person; identifying a plurality of media slots; and obtaining program information for a respective identified program aired in each media slot among the plurality of media slots, the program information including viewing data of a plurality of viewing persons viewing the program and each viewing person being among the plurality of persons. The methods also include enriching the viewing data with the consumer demographic data; identifying a plurality of advertiser industries; enriching the product purchaser data with the consumer demographic data; calculating a relevance of each advertiser industry among the plurality of advertiser industries for each identified program based on demographic attributes of the product purchasers in each advertiser industry and demographic attributes of the viewing persons.

20 Claims, 20 Drawing Sheets

Related U.S. Application Data

(60) Provisional application No. 62/032,936, filed on Aug. 4, 2014.

(51) Int. Cl.
| | |
|---|---|
| *G06Q 30/02* | (2012.01) |
| *H04N 21/234* | (2011.01) |
| *H04N 21/81* | (2011.01) |
| *H04N 21/2547* | (2011.01) |
| *H04N 21/442* | (2011.01) |
| *H04N 21/658* | (2011.01) |
| *H04N 21/24* | (2011.01) |
| *H04N 21/25* | (2011.01) |
| *H04N 21/2668* | (2011.01) |

(52) U.S. Cl.
CPC ..... *G06Q 30/0269* (2013.01); *G06Q 30/0273* (2013.01); *H04N 21/23424* (2013.01); *H04N 21/2407* (2013.01); *H04N 21/252* (2013.01); *H04N 21/2547* (2013.01); *H04N 21/25891* (2013.01); *H04N 21/2668* (2013.01); *H04N 21/44204* (2013.01); *H04N 21/4667* (2013.01); *H04N 21/6582* (2013.01); *H04N 21/812* (2013.01)

(58) Field of Classification Search
CPC ............. H04N 21/44204; G06Q 30/02; G06Q 30/0242; G06Q 30/0244
See application file for complete search history.

(56) References Cited

U.S. PATENT DOCUMENTS

| | | | |
|---|---|---|---|
| 6,772,129 B2 | 8/2004 | Alvarez et al. | |
| 6,973,665 B2* | 12/2005 | Dudkiewicz | H04N 7/163 725/46 |
| 8,117,050 B2* | 2/2012 | Li | G06Q 40/08 705/4 |
| 8,386,315 B1* | 2/2013 | Bala | G06Q 30/0241 705/14.43 |
| 2003/0070167 A1* | 4/2003 | Holtz | G06Q 30/0276 725/32 |
| 2003/0101454 A1* | 5/2003 | Ozer | G06Q 30/02 725/42 |
| 2006/0195443 A1* | 8/2006 | Franklin | G06Q 30/02 |
| 2007/0078717 A1* | 4/2007 | Ho | H04M 15/00 705/14.46 |
| 2008/0189735 A1* | 8/2008 | Barton | G11B 27/036 725/32 |
| 2008/0250445 A1* | 10/2008 | Zigmond | G06Q 30/0263 725/32 |
| 2008/0276266 A1* | 11/2008 | Huchital | H04N 21/4622 725/32 |
| 2009/0144201 A1* | 6/2009 | Gierkink | G06Q 30/02 705/64 |
| 2009/0150926 A1* | 6/2009 | Schlack | H04L 12/2856 725/34 |
| 2009/0328105 A1* | 12/2009 | Craner | H04N 21/4667 725/46 |
| 2010/0088719 A1* | 4/2010 | Hawkins | H04N 21/4667 725/34 |
| 2010/0145793 A1 | 6/2010 | Cavander et al. | |
| 2010/0313218 A1 | 12/2010 | Niemeijer et al. | |
| 2011/0078718 A1* | 3/2011 | Jakobi | H04H 60/63 725/14 |
| 2011/0288907 A1 | 11/2011 | Harvey et al. | |
| 2013/0205339 A1* | 8/2013 | Haberman | H04N 21/44204 725/35 |
| 2014/0337124 A1* | 11/2014 | Wan | G06F 16/9535 705/14.46 |
| 2014/0372181 A1* | 12/2014 | Hosoda | G06Q 10/0637 705/7.36 |

* cited by examiner

| NETWORK | 2010 | 2011 | 2012 | 2013 | TOTAL |
|---|---|---|---|---|---|
| CW | 0.248 | 0.202 | 0.187 | 0.162 | 0.199 |
| FOX | 0.198 | 0.196 | 0.173 | 0.169 | 0.184 |
| ABC | 0.144 | 0.160 | 0.170 | 0.172 | 0.161 |
| NBC | 0.137 | 0.146 | 0.142 | 0.139 | 0.141 |
| CBS | 0.128 | 0.132 | 0.133 | 0.127 | 0.130 |
| MEAN | 0.171 | 0.167 | 0.161 | 0.154 | 0.163 |

*FIG. 4*

| ROW LABELS | 2010 | 2011 | 2012 | 2013 | GRAND TOTAL |
|---|---|---|---|---|---|
| MTV | 5 | 5 | 5 | 5 | 5 |
| GOLTV | 5 | 5 | 5 | 5 | 5 |
| SPD | 5 | 5 | 5 | 5 | 5 |
| CNBC | 5 | 5 | 5 | 5 | 5 |
| MILI | 5 | 5 | 5 | 5 | 5 |
| ESQR | 5 | 5 | 5 | 5 | 5 |
| MTV2 | 5 | 5 | 5 | 5 | 5 |
| FOXB |  | 5 | 5 | 5 | 5 |
| GOLF | 5 | 5 | 5 | 5 | 5 |
| HDNET | 5 | 5 |  |  | 5 |
| SCI | 5 | 5 | 4 | 5 | 4.75 |
| NFLN | 5 | 4 | 5 | 5 | 4.75 |
| ESPD | 4 | 5 | 5 | 5 | 4.75 |
| ESPN | 4 | 5 | 5 | 5 | 4.75 |
| SPK | 4 | 4 | 5 | 5 | 4.5 |
| DFH | 4 | 5 | 5 | 4 | 4.5 |
| MLB | 5 | 4 | 5 | 4 | 4.5 |
| NBCSN | 5 | 5 | 4 | 4 | 4.5 |
| NKTN |  | 4 | 5 | 4 | 4.333333333 |
| VEL |  | 5 | 4 | 4 | 4.333333333 |

FIG. 5

| PROGRAM | DAY-HOUR | RECOMMENDED AD | CURRENT AD | RECOMMENDED tRATIO | CURRENT tRATIO |
|---|---|---|---|---|---|
| RIDICULOUSNESS | 1-0 | MUSIC | COSMETICS | 0.493 | 0.092 |
| RIDICULOUSNESS | 1-1 | MUSIC | CHARITY | 0.500 | 0.056 |
| RIDICULOUSNESS | 1-2 | MUSIC | CHARITY | 0.491 | 0.081 |
| RIDICULOUSNESS | 1-3 | MUSIC | CHARITY | 0.467 | (0.030) |
| RIDICULOUSNESS | 1-4 | MUSIC | CHARITY | 0.471 | 0.112 |
| RIDICULOUSNESS | 1-5 | MUSIC | COSMETICS | 0.465 | 0.311 |
| RIDICULOUSNESS | 1-6 | MUSIC | CHARITY | 0.394 | 0.000 |
| RIDICULOUSNESS | 1-7 | MUSIC | COSMETICS | 0.386 | 0.130 |
| RIDICULOUSNESS | 1-8 | MUSIC | COSMETICS | 0.401 | 0.132 |
| RIDICULOUSNESS | 1-9 | MUSIC | COSMETICS | 0.434 | 0.186 |
| AWKWARD. | 1-10 | MUSIC | COSMETICS | 0.236 | 0.184 |
| RIDICULOUSNESS | 1-11 | MUSIC | CHARITY | 0.438 | 0.105 |
| STEP UP | 1-12 | EDUCATION ONLINE | CHARITY | 0.349 | 0.173 |
| THE PACIFIER | 1-13 | EDUCATION ONLINE | CHARITY | 0.383 | 0.164 |
| THE PACIFIER | 1-14 | EDUCATION ONLINE | COSMETICS | 0.405 | 0.209 |
| CATFISH: THE TV SHOW | 1-15 | MUSIC | CHARITY | 0.353 | 0.148 |
| 16 AND PREGNANT | 1-16 | EDUCATION ONLINE | CHARITY | 0.285 | 0.080 |
| 16 AND PREGNANT | 1-17 | EDUCATION ONLINE | CHARITY | 0.270 | 0.141 |
| CATFISH: THE TV SHOW | 1-18 | MUSIC | CHARITY | 0.320 | 0.146 |
| CATFISH: THE TV SHOW | 1-19 | MUSIC | CHARITY | 0.328 | 0.180 |
| THE FAST AND THE FURIOUS: TO | 1-20 | EDUCATION ONLINE | EDUCATION ONLINE | 0.412 | 0.211 |
| CATFISH: THE TV SHOW | 1-21 | MUSIC | CHARITY | 0.353 | 0.135 |
| CATFISH: THE TV SHOW | 1-22 | MUSIC | COSMETICS | 0.362 | 0.173 |
| CATFISH: THE TV SHOW | 1-23 | MUSIC | COSMETICS | 0.356 | 0.202 |
| CATFISH: THE TV SHOW | 2-0 | MUSIC | CHARITY | 0.389 | 0.066 |
| RIDICULOUSNESS | 2-1 | MUSIC | CHARITY | 0.504 | 0.075 |
| RIDICULOUSNESS | 2-2 | MUSIC | CHARITY | 0.505 | 0.204 |
| RIDICULOUSNESS | 2-3 | MUSIC | CHARITY | 0.522 | (0.095) |
| RIDICULOUSNESS | 2-4 | MUSIC | CHARITY | 0.522 | 0.051 |
| RIDICULOUSNESS | 2-5 | MUSIC | CHARITY | 0.522 | 0.199 |

| PROGRAM | DAY-HOUR | RECOMMENDED AD | CURRENT AD | RECOMMENDED IRATIO | CURRENT IRATIO | RECOMMENDED CPM30 | CURRENT CPM30 |
|---|---|---|---|---|---|---|---|
| RIDICULOUSNESS | 1-0 | MUSIC | COSMETICS | 0.493 | 0.092 | 11.08 | 10.56 |
| RIDICULOUSNESS | 1-1 | MUSIC | CHARITY | 0.500 | 0.056 | 6.94 | 6.61 |
| RIDICULOUSNESS | 1-2 | MUSIC | CHARITY | 0.491 | 0.081 | 2.99 | 2.85 |
| RIDICULOUSNESS | 1-3 | MUSIC | CHARITY | 0.467 | (0.030) | 2.80 | 2.68 |
| RIDICULOUSNESS | 1-4 | MUSIC | CHARITY | 0.471 | 0.112 | 2.87 | 2.74 |
| RIDICULOUSNESS | 1-5 | MUSIC | COSMETICS | 0.465 | 0.311 | 2.90 | 2.77 |
| RIDICULOUSNESS | 1-6 | MUSIC | COSMETICS | 0.394 | 0.000 | 9.38 | 9.03 |
| RIDICULOUSNESS | 1-7 | MUSIC | COSMETICS | 0.386 | 0.130 | 10.36 | 9.97 |
| RIDICULOUSNESS | 1-8 | MUSIC | COSMETICS | 0.401 | 0.132 | 9.68 | 9.30 |
| RIDICULOUSNESS | 1-9 | MUSIC | COSMETICS | 0.434 | 0.186 | 9.52 | 9.12 |
| AWKWARD. | 1-10 | MUSIC | COSMETICS | 0.236 | 0.184 | 9.74 | 9.51 |
| RIDICULOUSNESS | 1-11 | MUSIC | CHARITY | 0.438 | 0.105 | 9.68 | 9.27 |
| STEP UP | 1-12 | EDUCATION ONLINE | CHARITY | 0.349 | 0.173 | 9.11 | 8.80 |
| THE PACIFIER | 1-13 | EDUCATION ONLINE | CHARITY | 0.383 | 0.164 | 9.63 | 9.27 |
| THE PACIFIER | 1-14 | EDUCATION ONLINE | COSMETICS | 0.405 | 0.209 | 9.58 | 9.21 |

TOP PROGRAMS FOR PLACING INTERIOR DECORATION (LIGHTING, FIXTURES, ETC)

| RECOMMENDED ICPM30 | CURRENT ICPM30 | INDUSTRIES | AIRINGS | IMPRESSIONS | RECOMMENDED COST | CURRENT COST | DIFF | %DIFF |
|---|---|---|---|---|---|---|---|---|
| 22.45 | 114.51 | 6 | 729 | 455,354 | 5,044,895 | 4,807,665 | 237,231 | 5% |
| 13.88 | 118.64 | 7 | 891 | 401,852 | 2,787,890 | 2,655,201 | 132,690 | 5% |
| 6.10 | 35.12 | 7 | 837 | 342,897 | 1,025,939 | 977,941 | 47,998 | 5% |
| 6.00 | 53.59 | 4 | 405 | 367,576 | 1,030,906 | 984,877 | 46,030 | 5% |
| 6.08 | 24.43 | 5 | 567 | 329,397 | 943,823 | 901,347 | 42,476 | 5% |
| 6.24 | 8.91 | 3 | 270 | 319,558 | 927,310 | 886,111 | 41,200 | 5% |
| 23.81 | 180.58 | 3 | 243 | 298,928 | 2,805,350 | 2,698,959 | 106,390 | 4% |
| 26.81 | 76.73 | 4 | 513 | 278,208 | 2,881,826 | 2,774,634 | 107,192 | 4% |
| 24.16 | 70.34 | 5 | 270 | 362,196 | 3,504,345 | 3,369,390 | 134,956 | 4% |
| 21.92 | 49.16 | 3 | 243 | 365,182 | 3,475,351 | 3,330,721 | 144,630 | 4% |
| 41.23 | 51.83 | 4 | 216 | 506,702 | 4,934,412 | 4,820,557 | 113,855 | 2% |
| 22.09 | 88.00 | 6 | 432 | 483,084 | 4,676,906 | 4,480,535 | 196,372 | 4% |
| 26.08 | 50.75 | 5 | 459 | 558,280 | 5,085,191 | 4,913,610 | 171,580 | 3% |
| 25.13 | 56.62 | 6 | 486 | 540,717 | 5,205,491 | 5,013,417 | 192,073 | 4% |
| 23.64 | 44.12 | 5 | 486 | 483,273 | 4,629,452 | 4,449,190 | 180,262 | 4% |

| HOUR OF DAY | PROGRAMNAME | CHARITY | COSMETICS | DENTAL INSURANCE | DIABETES HEALTH INSURANCE | DIABETIC HEALTH INSURANCE |
|---|---|---|---|---|---|---|
| 0 | RIDICULOUSNESS | -0.217782843 | 0.000759547 | -0.213330888 | 0.017145086 | 0.018851707 |
| 1 | RIDICULOUSNESS | -0.204482248 | 0.001189543 | -0.220773098 | 0.018016451 | 0.038955252 |
| 2 | RIDICULOUSNESS | -0.188507777 | 0.003699436 | -0.221759872 | 0.010491448 | 0.059293601 |
| 3 | RIDICULOUSNESS | -0.179697782 | -0.003087889 | -0.215866942 | -0.002521625 | 0.07665106 |
| 4 | RIDICULOUSNESS | -0.179577113 | 0.002063033 | -0.218389463 | -0.007413448 | 0.073379579 |
| 5 | RIDICULOUSNESS | -0.191911342 | -0.011719844 | -0.208649157 | 0.010406765 | 0.052120981 |
| 6 | RIDICULOUSNESS | -0.186792548 | -0.0264802 | -0.189657643 | 0.001151796 | 0.064790893 |
| 7 | RIDICULOUSNESS | -0.183271794 | -0.025686805 | -0.188217437 | -0.001283815 | 0.06095923 |
| 8 | RIDICULOUSNESS | -0.181201175 | -0.007437972 | -0.197655916 | -0.014647679 | 0.055131096 |
| 9 | RIDICULOUSNESS | -0.169842061 | 0.017599016 | -0.242466139 | -0.023078727 | 0.071175358 |
| 10 | AWKWARD. | -0.224197711 | 0.110816497 | 0.024041611 | -0.125280932 | -0.14801004 |
| 11 | RIDICULOUSNESS | -0.209770985 | -0.010054734 | -0.204065403 | 0.010033677 | 0.025886937 |
| 12 | STEP UP | -0.245436295 | -0.029859575 | -0.139931307 | -0.082082406 | -0.089151593 |
| 13 | THE PACIFIER | -0.246944707 | -0.020368103 | -0.160746839 | -0.071968914 | -0.108039 |
| 14 | THE PACIFIER | -0.199176373 | 0.010155825 | -0.194622438 | -0.084405848 | -0.090283003 |
| 15 | CATFISH: THE TV SHOW | -0.269098028 | 0.11955222 | -0.031148844 | -0.09470004 | -0.18165194 |
| 16 | 16 AND PREGNANT | -0.272923513 | 0.129603373 | 0.046623371 | -0.01045940 | -0.218867914 |
| 17 | 16 AND PREGNANT | -0.271328157 | 0.12393007 | 0.050689025 | -0.106802 | -0.210470233 |
| 18 | CATFISH: THE TV SHOW | -0.247470988 | 0.110567379 | -0.008020261 | -0.085769551 | -0.163087662 |
| 19 | CATFISH: THE TV SHOW | -0.251952807 | 0.119222986 | -0.003529234 | -0.092126193 | -0.170732223 |
| 20 | THE FAST AND THE FURIOUS: TOKYO DRIFT | -0.163250418 | 0.018604953 | -0.031260366 | -0.057156975 | -0.085043672 |
| 21 | CATFISH: THE TV SHOW | -0.249914786 | 0.154798193 | -0.021000074 | -0.115953474 | -0.163388604 |
| 22 | CATFISH: THE TV SHOW | -0.248540287 | 0.149855097 | -0.024444941 | -0.10418012 | -0.15721222 |

| DIET | DIY INVESTMENT | EDUCATION ONLINE | EXERCISE EQUIPEMENT | FITNESS PROGRAM/CLUB | HIGHINCOME CREDITCARD | HOME FURNISHINGS |
|---|---|---|---|---|---|---|
| -0.089748527 | -0.018851707 | 0.153097911 | -0.157379597 | -0.018688922 | -0.0940945 | 0.04539966 |
| -0.092680107 | -0.038955252 | 0.157109496 | -0.178281932 | -0.037516054 | -0.071213562 | 0.049969093 |
| -0.104332223 | -0.059233601 | 0.144154161 | -0.182253158 | -0.054765161 | -0.048339134 | 0.051446595 |
| -0.126402823 | -0.076651063 | 0.124198011 | -0.174809577 | -0.086440412 | -0.018095899 | 0.038027117 |
| -0.118756064 | -0.073379579 | 0.123809074 | -0.190530056 | -0.075317883 | -0.023224236 | 0.044079014 |
| -0.123818705 | -0.052120981 | 0.11621198 | -0.204433761 | -0.071216679 | -0.036017992 | 0.027993043 |
| -0.158410181 | -0.064790893 | 0.044024257 | -0.16261937 | -0.060369427 | -0.009087764 | -0.000262962 |
| -0.158616117 | -0.060953923 | 0.031403527 | -0.166421544 | -0.057162274 | -0.009250007 | -0.000751688 |
| -0.138173069 | -0.055131096 | 0.049457228 | -0.167878523 | -0.038583899 | -0.023382355 | 0.01933171 |
| -0.101416297 | -0.071175358 | 0.050107608 | -0.159877709 | -0.023562154 | -0.040482834 | 0.057445576 |
| 0.007080827 | -0.14801004 | 0.202412749 | -0.079918822 | 0.187456592 | -0.254546309 | 0.110661729 |
| -0.114898887 | -0.025886937 | 0.093578166 | -0.151287928 | -0.014054178 | -0.079786797 | 0.019640873 |
| 0.073806167 | -0.089151593 | 0.349194084 | 0.102945446 | -0.133822244 | -0.273914552 | -0.047693686 |
| 0.105251259 | -0.1080039 | 0.383118667 | 0.031807723 | 0.146219961 | -0.304066755 | -0.02762717 |
| 0.13622767 | -0.090283003 | 0.40515766 | 0.009088312 | 0.142247674 | -0.275421688 | 0.025233988 |
| 0.02008470.4 | -0.181651942 | 0.250646313 | -0.14787278 | 0.196027895 | -0.285642550 | 0.166091943 |
| 0.045972442 | -0.218867914 | 0.285056967 | -0.108542593 | 0.234345515 | -0.315668504 | 0.163011453 |
| 0.033030686 | -0.210470233 | 0.269611592 | -0.093027547 | 0.223602757 | -0.305555536 | 0.152594918 |
| -0.011845675 | -0.163087662 | 0.223978478 | -0.146236290 | 0.154878635 | -0.240149541 | 0.14791979 |
| -0.002050686 | -0.170732223 | 0.243739437 | -0.135983178 | 0.170424169 | -0.251652941 | 0.152467436 |
| 0.07628651 | -0.085043672 | 0.412150304 | 0.071943108 | 0.148341562 | -0.161521794 | -0.003925324 |
| 0.037683461 | -0.163388604 | 0.262867172 | -0.152677355 | 0.210800412 | -0.267096909 | 0.190812014 |
| 0.036694908 | -0.157212220 | 0.270052397 | -0.151916177 | 0.193972732 | -0.259825903 | 0.191017919 |

FROM FIG. 10A

| TV SCHEDULE (TIME) ORDER ON STATION ANIMAL PLANET STARTING AT 1 AM | | | | ↑RATIO ORDER |
|---|---|---|---|---|
| MONDAY | 1AM-2AM | | 129.9K | $346.4 |
| MONDAY | 3AM-4AM | UNTAMED AND UNCUT | 129.9K | $346.4 |
| MONDAY | 4AM-5AM | UNTAMED AND UNCUT | 107.7K | $265.8 |
| MONDAY | 5AM-6AM | UNTAMED AND UNCUT | 97.4K | $252.6 |
| MONDAY | 6AM-7AM | THE MOST EXTREME | 101.8K | $245.4 |
| MONDAY | 7AM-8AM | WEIRD, TRUE AND FREAKY | 123.3K | $290.0 |
| MONDAY | 8AM-9AM | UNTAMED AND UNCUT | 167.6K | $379.4 |
| MONDAY | 9AM-10AM | UNTAMED AND UNCUT | 200.5K | $450.9 |
| MONDAY | 10AM-11AM | UNTAMED AND UNCUT | 247.9K | $559.1 |
| MONDAY | 11AM-12PM | BAD DOG! | 260.7K | $655.3 |
| MONDAY | 12PM-1PM | CALL OF THE WILDMAN: MORE LIVE | 285.4K | $382.3 |

EARLY MORNING YOUNGER AUDIENCE: MUSIC, TECHNICAL COLLEGES

DAYTIME TV ORDER AUDIENCE ~ 11AM: SENIOR LIFE INSURANCE, ETC 3,864 SELECTED OUT OF 11,638 RECORDS | RESET ALL

| STATION | DAY | HOUR | PROGRAM | CURRENT BRAND | CUR INDY | CUR CPM | OPTIM | ΔCPM | ΔREV | ΔtRATIO | 1ST | 2ND | 3RD | 4TH |
|---|---|---|---|---|---|---|---|---|---|---|---|---|---|---|
| ANPL | MONDAY | 6AM-7AM | THE MOST EXTREME | ASHLEY FURNITURE HOMESTORE- | | $2.4 | $2.6 | $0.2 | $19.2 | 0.25 | | | | |
| ANPL | MONDAY | 7AM-8AM | WEIRD TRUE AND | COLONIAL PENN INSURANCE-LIFE | | $2.4 | $2.4 | $0.0 | $2.3 | 0.03 | | | | |
| ANPL | MONDAY | 8AM-9AM | UNTAMED AND UNCUT | BANANA BOAT SUNSCREEN | | $2.3 | $2.4 | $0.1 | $21.2 | 0.18 | | | | |
| ANPL | MONDAY | 9AM-10AM | DOGS 101 | MITSUBISHI OUTLANDER TRUCKS | | $2.3 | $2.8 | $0.5 | $102.8 | 0.67 | | | | |
| ANPL | MONDAY | 10AM-11AM | DOGS 101 | MITSUBISHI OUTLANDER TRUCKS | | $2.3 | $2.9 | $0.6 | $138.1 | 0.72 | | | | |
| ANPL | MONDAY | 11AM-12PM | BAD DOG! | K12 EDUCATIONAL PROGRAM | | $2.5 | $2.8 | $0.3 | $74.2 | 0.38 | | | | |
| ANPL | MONDAY | 12PM-1PM | FINDING BIGFOOT | OLAY REGENERIST MOISTURIZER-FACIAL | | $2.4 | $2.8 | $0.4 | $105.6 | 0.48 | | | | |
| ANPL | MONDAY | 1PM-2PM | UNKNOWN | EUCERIN EVERYDAY PROTECTION | | $2.4 | $2.9 | $0.5 | $126.4 | 0.59 | | | | |
| ANPL | MONDAY | 2PM-3PM | UNKNOWN | LA-Z-BOY FURNITURE | | $2.4 | $2.9 | $0.5 | $131.9 | 0.60 | | | | |
| ANPL | MONDAY | 3PM | CALL OF | ST IVES SOOTHING | | $2.4 | $2.8 | $0.4 | $108.3 | 0.50 | | | | |

FIG. 12

| SET ▼ | | | | |
|---|---|---|---|---|
| | | 9PM | | |
| ANPL | THURSDAY | 11PM-12AM | RIVER MONSTERS: UNHOOKED | 229.5K | $818.4 | 🖼 |
| ANPL | SUNDAY | 11AM-12PM | DOGS 101 | 230.3K | $536.8 | 🖼 |
| ANPL | THURSDAY | 9PM-10PM | RIVER MONSTERS: UNHOOKED | 280.9K | $924.1 | 🖼 |
| ANPL | MONDAY | 2AM-3AM | TOO CUTE! | 172.2K | $492.6 | 🖼 |
| ANPL | SUNDAY | 10AM-11AM | DOGS 101 | 217.7K | $512.0 | 🖼 |
| ANPL | MONDAY | 5PM-6PM | FINDING BIGFOOT: FURTHER EVIDENCE | 311.9K | $748.2 | 🖼 |
| ANPL | MONDAY | 7PM-8PM | GATOR BOYS | 324.4K | $769.5 | 🖼 |
| ANPL | THURSDAY | 12AM- | BLUE | 210.1K | $729.9 | 🖼 |

HIGHER IRATIO ADS ARE MORE RELEVANT TO THE AUDIENCE AND THE

DIET IRATIO 0.30 — TOO CUTE! GREAT AUDIENCE!

GATOR BOYS: NOT GOOD FOR THE DIET ADVERTISER

*FIG. 13*

HOME > ADVERTISER > NETWORK YIELD OPTIMIZER

MARKET [NATIONAL ▽]  STATION [MTV ▽]
PROGRAM [    ] ☑NULL  DAYOFWEEK [SAT ▽]
HOUROFDAY [7PM ▽]

⏮ ◀ [1] OF 2 ?? ▶ ⏭ [100% ▽]    [    ] FIND | NEXT 🔽 ▾ @ 🕐 ⌗

| NIELSON DIVISION NAME ⇵ | fRATIO ⇵ | AVG CPM ⇵ | SUGGESTED PRICE ⇵ | COMPANY'S HISTORICAL SPEND ⇵ | AGENCY NAME |
|---|---|---|---|---|---|
| BEATS ELECTRONICS LLC | 0.38 | 6.60 | 9.09 | 37,140,515 | |
| APPLE INC | 0.38 | 6.60 | 9.09 | 26,587,154 | PRECISIONDEMAND |
| LISTEN.COM INC | 0.38 | 6.60 | 9.09 | 9,252,521 | |
| SPOTIFY LTD | 0.38 | 6.60 | 9.09 | 1,306,570 | |
| RDIO INC | 0.38 | 6.60 | 9.09 | 1,020,281 | |
| ART INST INTL LLC | 0.34 | 6.60 | 8.82 | 16,805,556 | |
| UNIVERSITY OF PHOENIX INC | 0.34 | 6.60 | 8.82 | 8,671,706 | CARAT |
| ITT EDUCATIONAL SVCS INC | 0.34 | 6.60 | 8.82 | 5,791,921 | |
| DEVRY UNIVERSITY INC | 0.34 | 6.60 | 8.82 | 4,529,411 | STARCOM MEDIAVEST |
| EDUCATION CONNECTION SVCS INC | 0.34 | 6.60 | 8.82 | 2,704,748 | INTERMEDIA-ADVERTISING |
| UNIVERSAL TECHNICAL INST INC | 0.34 | 6.60 | 8.82 | 2,683,713 | ID MEDIA |
| CAPELLA UNIVERSITY INC | 0.34 | 6.60 | 8.82 | 2,059,780 | IN HOUSE |
| COLORADO TECHNICAL UNIVERSITY | 0.34 | 6.60 | 8.82 | 1,774,994 | |
| CORINTHIAN COLLEGES INC | 0.34 | 6.60 | 8.82 | 1,758,285 | PLATFORM ADVERTISING |
| BRIDGEPOINT EDUCATION INC | 0.34 | 6.60 | 8.82 | 1,189,505 | |
| K12 INC | 0.34 | 6.60 | 8.82 | 1,159,282 | |
| STEPHENS INST INC | 0.34 | 6.60 | 8.82 | 1,153,312 | |
| KAPLAN HIGHER EDUCATION CORP | 0.34 | 6.60 | 8.82 | 583,668 | IN HOUSE |

FIG. 15

HOME > ADVERTISER > NETWORK YIELD OPTIMIZER

MARKET: NATIONAL   STATION: E! ENTERTAINMENT   ☑ NULL
PROGRAM:
HOUROFDAY: 11 AM   DAYOFWEEK: WED

|◁ ◁ 1 OF 2 ▷ ▷| 100%    FIND | NEXT 📄▾ ⊙ ⊕ 🎯 ⊞

| NIELSON DIVISION NAME ⇕ | iRATIO ⇕ | AVG CPM ⇕ | SUGGESTED PRICE ⇕ | COMPANY'S HISTORICAL SPEND ⇕ | AGENCY NAME |
|---|---|---|---|---|---|
| CARE.COM INC | 0.40 | 3.83 | 5.38 | 10,217,472 | |
| WAYFAIR LLC | 0.40 | 3.83 | 5.38 | 10,194,512 | |
| BROWNSTONE PUBLISHING LLC | 0.40 | 3.83 | 5.38 | 9,712,664 | |
| ZULILY INC | 0.40 | 3.83 | 5.38 | 7,838,742 | |
| JOSS & MAIN LLC | 0.40 | 3.83 | 5.38 | 1,803,376 | |
| ART.COM INC | 0.40 | 3.83 | 5.38 | 571,238 | PRECISIONDEMAND |
| ANGIES LIST INC | 0.40 | 3.83 | 5.38 | 60,725 | |
| SAFE AUTO INSURANCE CO | 0.40 | 3.83 | 5.38 | 2,661 | |
| ACURA DIVISION | 0.40 | 3.83 | 5.38 | 1,460 | MEDIAVEST |
| COX COMMUNICATIONS INC | 0.40 | 3.83 | 5.38 | 1,151 | |
| PSA PARENT | 0.40 | 3.83 | 5.38 | 479 | HAVAS |
| OFFICE DEPOT INC | 0.40 | 3.83 | 5.38 | 435 | |
| AVON PRODUCTS INC | 0.40 | 3.83 | 5.38 | 388 | |
| SIMMONS & FLETCHER | 0.40 | 3.83 | 5.38 | 369 | |
| JACKS CARPET INC | 0.40 | 3.83 | 5.38 | 289 | |
| KAPLAN HIGHER EDUCATION CORP | 0.40 | 3.83 | 5.38 | 284 | IN HOUSE |
| SPIEGEL FELIX MD FACS | 0.40 | 3.83 | 5.38 | 273 | |
| INTL DAIRY QUEEN INC | 0.40 | 3.83 | 5.38 | 271 | |

FIG. 16

HOME > ADVERTISER > NETWORK YIELD OPTIMIZER

MARKET [NATIONAL ▼] STATION [FOX NEWS ▼]
PROGRAM [    ] ☑ NULL DAYOFWEEK [SAT ▼]
HOUROFDAY [7PM ▼]

[◄◄ ◄ [1] OF 2? ► ►►] [100% ▼] [    ] FIND | NEXT 📄▼ ⊕ 🔍 ⊞ — 1720

| NIELSON DIVISION NAME ⇕ | iRATIO ⇕ | AVG CPM ⇕ | SUGGESTED PRICE ⇕ | COMPANY'S HISTORICAL SPEND ⇕ | AGENCY NAME |
|---|---|---|---|---|---|
| AMERICAN ASSN OF RETIRED PERSONS | 0.39 | 1.84 | 2.55 | 53,003,545 | |
| MUTUAL OF OMAHA INSURANCE CO | 0.39 | 1.84 | 2.55 | 12,536,495 | PRECISIONDEMAND |
| PHYSICIANS MUTUAL INSURANCE CO | 0.39 | 1.84 | 2.55 | 580,846 | MEDIACOM |
| AUDI OF AMERICA INC | 0.32 | 1.84 | 2.43 | 62,128,018 | TEAM ONE |
| LEXUS DIVISION | 0.32 | 1.84 | 2.43 | 51,623,511 | PHD |
| MERCEDES-BENZ USA LLC | 0.32 | 1.84 | 2.43 | 21,080,594 | MINDSHARE |
| JAGUAR CARS LTD | 0.32 | 1.84 | 2.43 | 20,984,092 | UNIVERSAL MCCANN |
| BMW OF NORTH AMERICA LLC | 0.32 | 1.84 | 2.43 | 15,343,310 | SAATCHI |
| LINCOLN-MERCURY DIVISION | 0.32 | 1.84 | 2.43 | 8,826,298 | CARAT |
| CADILLAC MOTOR CO | 0.32 | 1.84 | 2.43 | 5,067,982 | OMD |
| INFINITY DIVISION | 0.32 | 1.84 | 2.43 | 4,024,699 | MINDSHARE |
| FORD MOTOR CO | 0.32 | 1.84 | 2.43 | 2,830,436 | MEDIAWEST |
| ACURA DIVISION | 0.32 | 1.84 | 2.43 | 1,866,733 | ZENITH |
| TOYOTA MOTOR SALES USA INC | 0.32 | 1.84 | 2.43 | 1,701,285 | CARAT |
| CHEVORLET MOTOR DIVISION | 0.32 | 1.84 | 2.43 | 1,563,776 | |
| VOLKSWAGEN OF AMERICA INC | 0.32 | 1.84 | 2.43 | 1,339,065 | |
| HYUNDAI MOTOR AMERICA | 0.32 | 1.84 | 2.43 | 1,304,773 | |
| NISSAN NORTH AMERICA INC | 0.37 | 1.84 | 2.43 | 1,262,079 | OMD |

| DAY | HOUR | PROGRAM | CURRENT BRAND | INDY | CPM | OPTIM | ΔCPM | ΔREV | ΔtRATIO | 1ST | 2ND | 3RD | 4TH |
|---|---|---|---|---|---|---|---|---|---|---|---|---|---|
| SATURDAY | 10PM-11PM | WGN NEWS AT NINE | UNIVERSITY OF PHEONIX UNIVERSITY | | $3.0 | $4.0 | $1.0 | $82.0 | 0.94 | | | | |
| SATURDAY | 3AM-4AM | FUTURAMA | COLONIAL PENN INSURANCE-LIFE | | $1.5 | $1.9 | $0.4 | $12.4 | 0.84 | | | | |
| FRIDAY | 3AM-4AM | FUTURAMA | COLONIAL PENN INSURANCE-LIFE | | $1.5 | $1.9 | $0.4 | $12.2 | 0.83 | | | | |
| WEDNESDAY | 3AM-4AM | FUTURAMA | COLONIAL PENN INSURANCE-LIFE | | $1.5 | $1.9 | $0.4 | $11.9 | 0.82 | | | | |
| THURSDAY | 3AM-4AM | FUTURAMA | COLONIAL PENN INSURANCE-LIFE | | $1.6 | $2.0 | $0.4 | $12.6 | 0.82 | | | | |
| MONDAY | 10PM-11PM | WGN NEWS AT NINE | UNIVERSITY OF PHEONIX UNIVERSITY | | $2.1 | $2.6 | $0.6 | $40.2 | 0.79 | | | | |
| MONDAY | 3PM-4PM | IN THE HEAT OF THE NIGHT | KIA SORENTO TRUCKS | | $3.0 | $3.7 | $0.7 | $339.7 | 0.78 | | | | |
| SUNDAY | 10PM-11PM | AMERICA'S FUNNIEST | UNIVERSITY OF PHEONIX UNIVERSITY | | $3.2 | $3.9 | $0.7 | $94.5 | 0.74 | | | | |

FIG. 18

| | | | | | | | |
|---|---|---|---|---|---|---|---|
| SATURDAY 1PM-2PM | THE CHEW | BOYS TOWN CHARITABLE ORGN | | $5.6 | $5.6 | $0.0 | $0.0 | -0.60 | |
| SATURDAY 2PM-3PM | GENERAL HOSPITAL | MAYBELINE VOLUM EXPRESS MASCARA | | $4.8 | $4.8 | $0.0 | $0.0 | -0.74 | |
| SATURDAY 3PM-4PM | COLLEGE FOOTBALL | OLAY TOTAL EFFECTS MOISTURIZER-FACIAL | | $5.4 | $6.2 | $0.8 | $2.8K | 0.46 | |
| SATURDAY 4PM-5PM | COLLEGE FOOTBALL | FIDELITY INVESTMENTS FINANCIAL- | | $18.9 | $18.9 | $0.0 | $0.0 | -0.09 | |
| SATURDAY 5PM-6PM | COLLEGE FOOTBALL | MITSUBISHI OUTLANDER TRUCKS | | $21.7 | $21.7 | $0.0 | $0.0 | 0.00 | |
| SATURDAY 6PM-7PM | COLLEGE FOOTBALL | INFINITY JX TRUCKS | | $6.6 | $6.6 | $0.0 | $0.0 | 0.00 | |
| SATURDAY 7PM-8PM | UNKNOWN | BOYS TOWN CHARITABLE ORGN | | $24.8 | $24.8 | $0.0 | $0.0 | -0.48 | |
| SATURDAY 8PM-9PM | LAST MAN STANDING | BOYS TOWN CHARITABLE ORGN | | $14.1 | $14.1 | $0.0 | $0.0 | -0.63 | |
| SATURDAY 9PM-10PM | SHARK TANK | HABITAT FOR HUMANITY | | $12.5 | $12.5 | $0.0 | $0.0 | -0.52 | |

FIG. 19

SYSTEMS AND METHODS FOR OPTIMIZED DELIVERY OF TARGETED MEDIA

CROSS-REFERENCE TO RELATED APPLICATIONS

This application is a continuation of and claims the benefit of priority to U.S. application Ser. No. 16/733,777, filed Jan. 3, 2020, which is a continuation of and claims the benefit of priority to U.S. application Ser. No. 16/118,650, filed Aug. 31, 2018, now U.S. Pat. No. 10,567,820, issued Feb. 18, 2020, which is a continuation of and claims the benefit of priority to U.S. patent application Ser. No. 14/817,990, filed Aug. 4, 2015, now U.S. Pat. No. 10,104,411, issued Sep. 26, 2018, which claims the benefit of priority to U.S. Provisional Patent Application No. 62/032,936, filed on Aug. 4, 2014, which are incorporated herein by reference in their entireties.

This application makes reference to U.S. non-provisional application Ser. No. 13/209,346, entitled "Automatically Targeting Ads to Television Using Demographic Similarity," filed Aug. 12, 2011, which is incorporated herein by reference in its entirety.

TECHNICAL FIELD

Various embodiments of the present disclosure relate generally to improving methods for providing targeted, e.g., user-specific, advertising to users' television set-top boxes.

BACKGROUND

Television advertising remains the largest advertising category in the United States and has been the premium medium for advertising since the 1950s. Television networks, broadcasters, and cable companies generate approximately 75 billion dollars per year in revenue from ads inserted into television program breaks.

Advertisers bid for placement in commercial breaks, and can optionally specify the television program, network, or hours during which they would want their ad to run. In turn, television networks then insert the ad based on the advertiser constraints. Ads are then embedded/inserted into the video stream in commercial breaks.

However there are many questions to be answered for television networks about exactly how to insert the ads. Television networks generally have fairly loose constraints about what ads they can insert where. How should they insert ads so as to maximize their yield, and perhaps the yield for their advertising clients also?

Previous work in ad relevance is most prevalent in online advertising (Hillard, et. al., 2010). Bing and Google utilize click through rate as a measure of relevance to balance revenue generation with user experience. Ranking functions for search ads use click through rate multiplied by price (Jansen, 2006). In contrast, there has been little work on TV ad relevance (Hanssens, et. al., 2001; Johansson, 1979; Simon and Arndt, 1980; Jones, 1997; Vakratsas, et. al., 2004). Ewing (2013) used survey methods to measure television ad relevance from 2002 to 2013. However this work was at a very high level and it did not go into networks, programs, or how to improve relevance. Zigmond, Dorai-Raj, Interian and Naverniouk (2009) used viewer tune-away behavior during commercial breaks as a proxy for relevance. However, none of the aforementioned studies have resulted in a suitable level of individual-specific targeting desired by television advertisers today.

The present disclosure is directed to overcoming one or more of these above-referenced challenges.

SUMMARY OF THE DISCLOSURE

According to certain aspects of the disclosure, methods are disclosed for recommending television ad placement for multiple advertisers, one method comprising: identifying a plurality of media slots; obtaining, from a first server over a network, program information for a respective identified program aired in each media slot among the plurality of media slots, the program information including viewing data of a plurality of viewing persons viewing the program; identifying a plurality of advertiser industries; calculating a first relevance of each advertiser industry among the plurality of advertiser industries for each identified program; associating an advertiser industry among the plurality of advertiser industries with each respective identified program; calculating a second relevance of the associated advertiser industry for the respective identified program; and generating recommendations for an advertiser among the plurality of advertiser industries based on the calculated first relevance of each advertiser industry and the calculated second relevance of the associated advertiser industry.

According to certain aspects of the disclosure, systems are disclosed for recommending television ad placement for multiple advertisers, one system comprising: a first server providing program information for a respective identified program aired in each media slot among a plurality of media slots over a network, the program information including viewing data of a plurality of viewing persons viewing the program; and an advertising targeting controller configured to: obtain the program information; identify the plurality of media slots; identify a plurality of advertiser industries; calculate a first relevance of each advertiser industry among the plurality of advertiser industries for each identified program; associate an advertiser industry among the plurality of advertiser industries with each respective identified program; calculate a second relevance of the associated advertiser industry for the respective identified program; and generate recommendations for a target advertiser industry among the plurality of advertiser industries based on the calculated first relevance of each advertiser industry and the calculated second relevance of the associated advertiser industry.

According to certain aspects of the disclosure, non-transitory computer readable media are disclosed storing a program causing a computer to execute a method of recommending television ad placement for multiple advertisers. One method comprises: identifying a plurality of media slots; obtaining, from a first server over a network, program information for a respective identified program aired in each media slot among the plurality of media slots, the program information including viewing data of a plurality of viewing persons viewing the program; identifying a plurality of advertiser industries; calculating a first relevance of each advertiser industry among the plurality of advertiser industries for each identified program; associating an advertiser industry among the plurality of advertiser industries with each respective identified program; calculating a second relevance of the associated advertiser industry for the respective identified program; and generating recommendations for a target advertiser industry among the plurality of advertiser industries based on the calculated first relevance of each advertiser industry and the calculated second relevance of the associated advertiser industry.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a report showing network relevance, according to exemplary embodiments of the present disclosure.

FIG. 5 depicts a report showing network relevance, according to exemplary embodiments of the present disclosure.

FIGS. 8 and 9 depict reports providing schedule improvements to increase ad relevance, according to exemplary embodiments of the present disclosure.

FIGS. 10A and 10B depict an advertising schedule with visual shading, according to exemplary embodiments of the present disclosure.

FIG. 11 depicts a report providing advertisers to contact, according to exemplary embodiments of the present disclosure.

FIG. 12 depicts a report providing possible ad insertions by tratio difference, according to exemplary embodiments of the present disclosure.

FIG. 13 depicts a report providing ad relevance for one particular advertiser, according to exemplary embodiments of the present disclosure.

FIGS. 15-17 depict a GUI to generate an advertiser contact list, according to exemplary embodiments of the present disclosure.

FIG. 18 depicts a report providing the largest gains in ad relevance, according to exemplary embodiments of the present disclosure.

FIG. 19 depicts a report providing the best media for an advertiser, according to exemplary embodiments of the present disclosure.

DETAILED DESCRIPTION OF THE DRAWINGS

Figure 1:
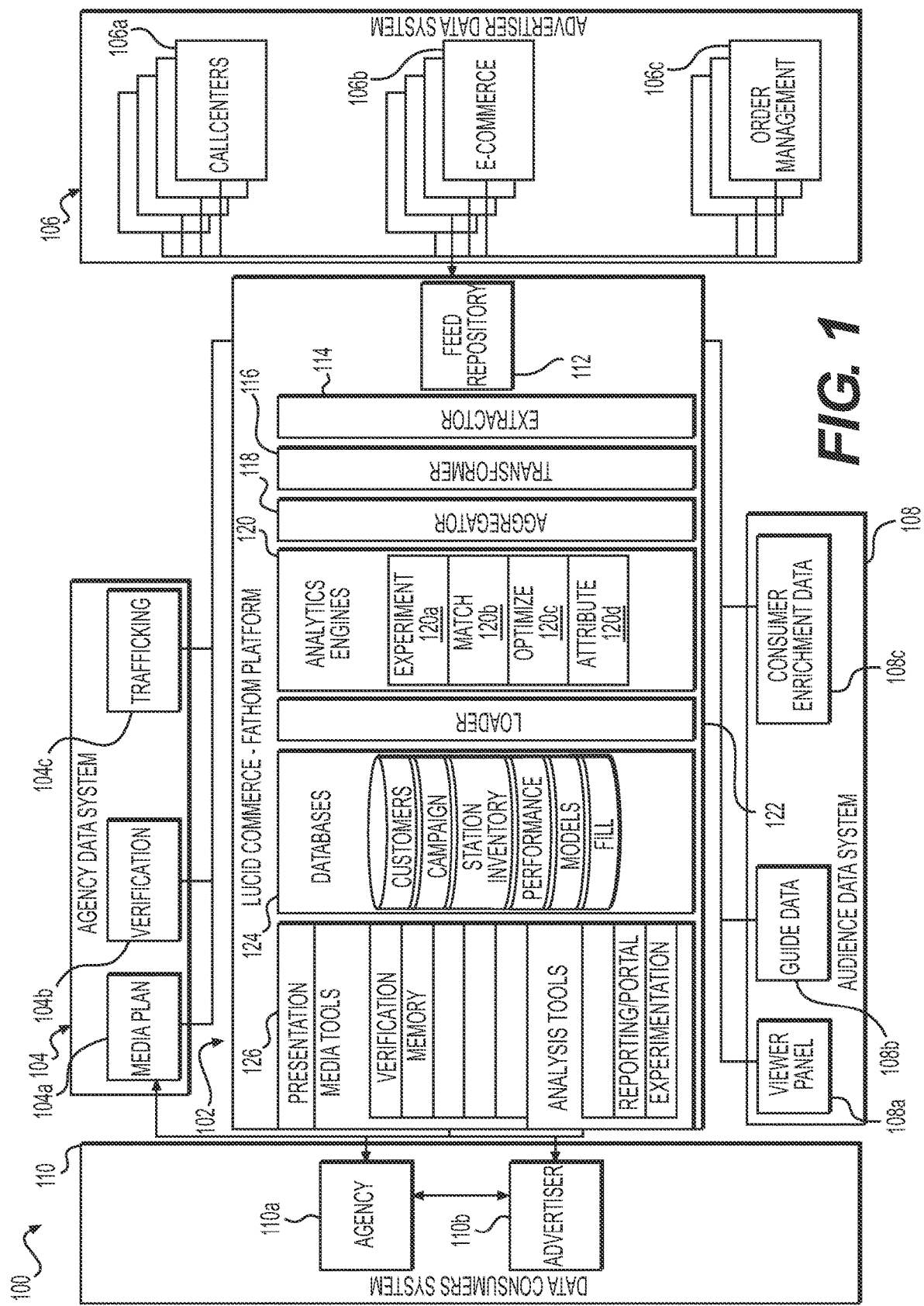
FIG. 1 depicts an exemplary analytics environment and an exemplary system infrastructure for modeling and detailed targeting of television media, according to exemplary embodiments of the present disclosure.

FIG. 15. "Contact list GUI": The user selects Market, Network (Station), Day, Hour and/or Program name (if applicable). The system then presents a list of advertisers to contact who would be likely to want to place ads in a commercial break for that program/time/network. The inventory could be specified in more detail—for example, pod group number (the commercial break number, e.g. 1 is the first commercial break) and pod position (the order in which the ad appears in the commercial break, e.g. 2 means it would be the second ad to appear in the break) could also be selected. In 2015 media is often not bought with pod position as part of the negotiations, however it has sometimes been added as a request when buying media.

This figure shows the "Contact list for MTV primetime weekend": MTV top advertisers to contact would be streaming music companies, followed by Colleges. The audience for MTV tends to be young adults, and these products are in great demand from young adults. It is a little ironic that music service companies such as Rdio, Beats, Apple, etc., all show up on a television network that is "Music Television," but this is what happens—these music services tend to be favored by young adults which is why they sort to the top. Technical colleges also show up as advertisers who would be interested in the inventory.

FIG. 16 shows an example "Contact-list for E! daytime on Wed": E! Entertainment Wednesday 11 am top advertisers to contact would be second hand clothing companies such as Zulily, Care, Joss and Main; interior decoration companies such as Art.com, followed by cosmetics. The audience for E! tends to be budget-conscious young women with young families, and so these industries showing up as top prospects for E! Daytime makes a lot of sense.

FIG. 17 shows an example "Contact list for Fox News": Fox News Saturday 7 pm: Top ads to insert would be AARP, Mutual of Omaha and Physicians Mutual Life insurance, followed by a variety of luxury cars. The viewers of Fox News on Saturdays at 7 pm tend to be working age, elderly and higher income people, which is why life insurance and luxury autos are relevant ads—these advertising categories are purchased by people matching the demographics for Fox News. The contact list of agencies who are responsible for each advertiser is shown at right.

DETAILED DESCRIPTION OF EMBODIMENTS

Various embodiments of the present disclosure relate generally to improving methods for providing targeted advertising to television set-top boxes. Specifically, embodiments include creating a demographic profile of consumers of a particular product, along with a demographic profile of a population viewing a particular TV show or a demographic profile of an individual using a set-top box. Thereafter, targeted advertising may be inserted into media by comparing the demographic profile of consumers of particular products with the other demographic profiles. The embodiments of this disclosure uniquely allow for providing specified targeted advertising at an individual consumer level using set-top boxes.

Thus, the present disclosure is directed to a system for measuring ad relevance that may be used as part of an optimization system to improve network and advertiser outcomes, both in determining what inventory is available, and where to place ads in order to overcome one or more of the above-referenced challenges. Aspects of the present disclosure, as described herein, relate to systems and methods for automated television ad targeting using set top box data. Aspects of the present disclosure involve selecting a segment of TV media to purchase to insert an ad, such that advertiser value per dollar is maximized.

Various examples of the present disclosure will now be described. The following description provides specific details for a thorough understanding and enabling description of these examples. One skilled in the relevant art will understand, however, that the present disclosure may be practiced without many of these details. Likewise, one skilled in the relevant art will also understand that the present disclosure may include many other related features not described in detail herein. Additionally, some understood structures or functions may not be shown or described in detail below, so as to avoid unnecessarily obscuring the relevant description.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The systems and method of the present disclosure allow for automated television ad targeting using set top box data.

I. System Architecture

Any suitable system infrastructure may be put into place to receive media related data to develop a model for targeted advertising for television media. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1, which may operate according to the descriptions of U.S. patent application Ser. No. 13/209,346, filed Aug. 12, 2011, the disclosure of which is hereby incorporated herein by reference. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

II. Defining Calculation of Television Ad Relevance

Figure 2:
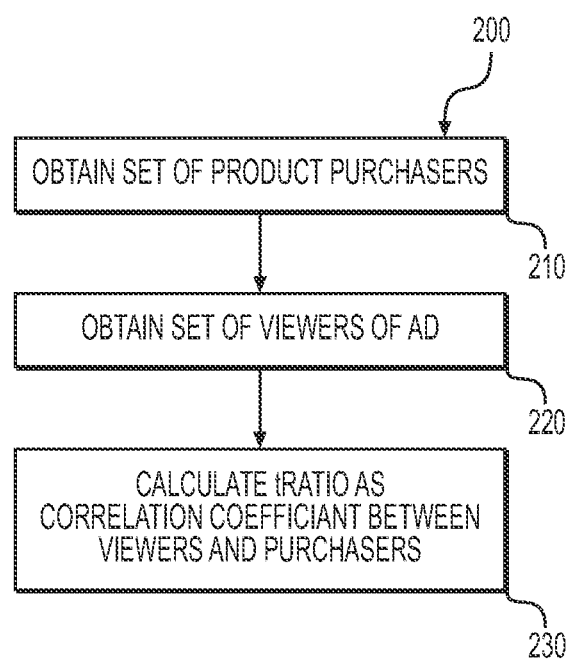
FIG. 2 depicts a flowchart for high dimensional set top box targeting, according to exemplary embodiments of the present disclosure.

One method of calculating ad relevance according to exemplary embodiments of the present disclosure, as illustrated in FIG. 2, may include obtaining a set of persons who have proven their interest by purchasing the service or product in question (step 210); obtaining a set of persons who view the ad (step 220); and calculating the correlation coefficient between the viewers and the purchasers (step 230).

The resulting ad relevance measure may be referred to as the "tratio." Tratio may be a parameter bounded between −1 and 1. Detailed information on tratio calculations are provided in the Glossary section.

Figure 3:
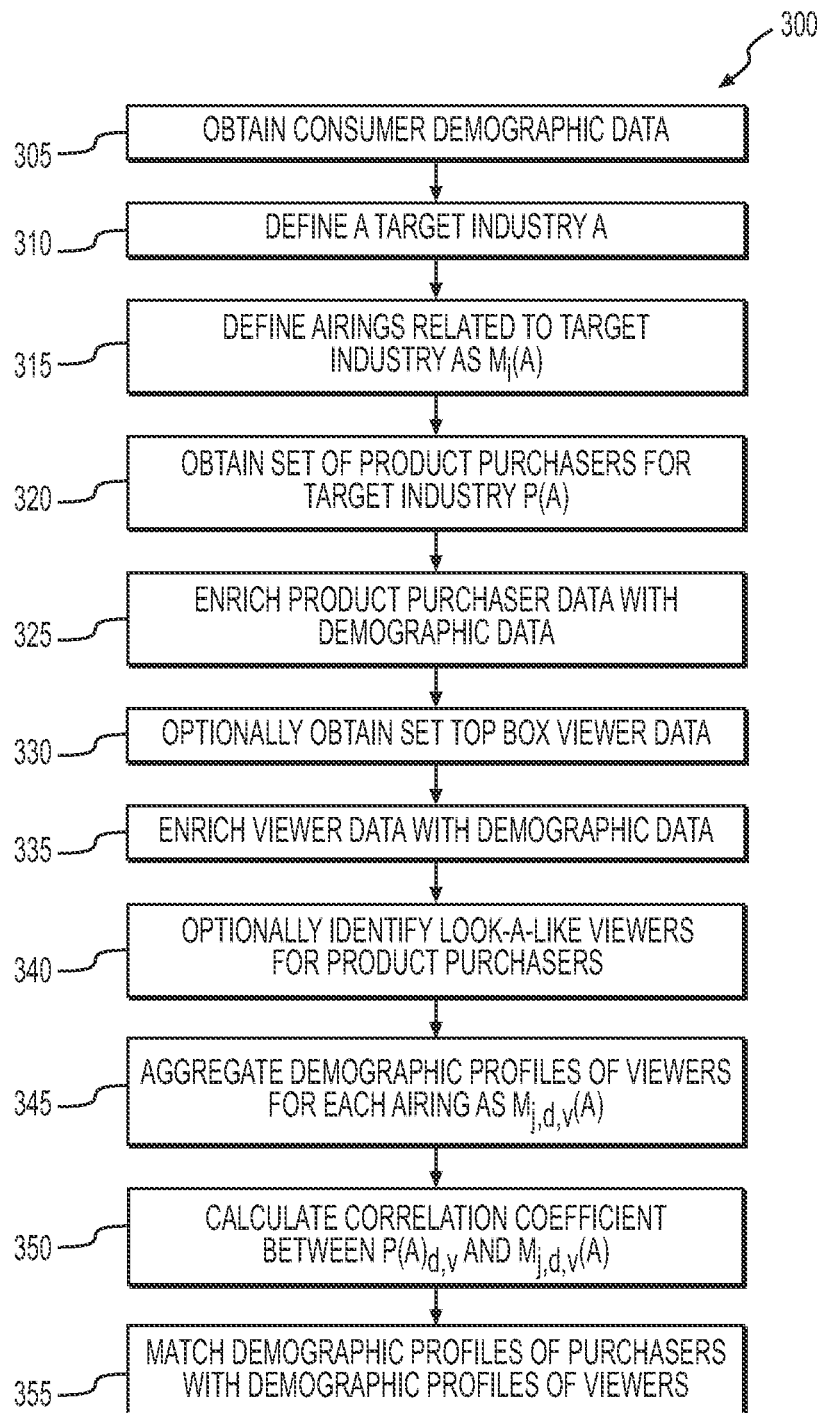
FIG. 3 depicts a flowchart for estimating ad relevance across a range of industries, according to exemplary embodiments of the present disclosure.

Ad relevance may be estimated across a range of industries. FIG. 3 illustrates a method for such estimation according to exemplary embodiments of the present disclosure as follows. As an initial matter, the method of FIG. 3 may optionally include obtaining commercially available consumer demographics (step 305).

1. Define Advertiser Industries: Define a set of industries {A} which is a set of advertiser-industries who are advertising on television. (step 310) The industries may include, for example, "High Income Credit Card," "Power Tools," "Home Furnishings," "Life Insurance," "Jewelry," "Education Online," "Luxury Autos", "Pickup Trucks," and many others. An example of defined industries is shown in Table 1, below, and some example mappings between advertisers and the industries are shown in Table 2, below. Defining industries can be done by mapping a Nielsen recorded classification to an industry. The Glossary includes two more detailed examples of industries and their definitions.

2. Extract a set of television airings for the industry A $M_i(A)$ (step 315). There are 750 million airings in the United States over 3 years of US television airings. These 750 million airings may be sampled for efficiency reasons to a smaller number of airings, sampled randomly (e.g. 2.5 million airings). Historical U.S. television airings may be tracked by Nielsen, and Nielsen may provide its own naming convention to describe the advertiser. A mapping table may be used to map these advertiser names to appropriate industries. The airings can be sampled, for example, by sampling where the modulus of a unique and randomly assigned airingID is equal to a particular value.

TABLE 1

Example Industries

| Job ID | Advertiser Name |
|---|---|
| 1 | Charity |
| 2 | Diabetic Health insurance |
| 3 | Diet |
| 4 | Dental Insurance |
| 5 | Home Furnishings |
| 6 | Investment Services |
| 7 | Life Insurance |
| 8 | Music |
| 9 | Power tools |
| 10 | SUVs |
| 11 | T rucks |
| 12 | Education online |
| 52 | Diabetes Health insurance |
| 53 | Luxury auto |
| 54 | Truck Pickup |
| 55 | PMIC Brand |
| 56 | High Income Credit Card |
| 57 | Senior Life Insurance |
| 58 | DIY investment |
| 59 | Exercise Equipment |
| 60 | Fitness Program/Club |
| 61 | Term |
| 62 | life insurance investment |
| 63 | Cosmetics |
| 64 | Teenage extra-curricular activities |
| 65 | Technical colleges |
| 66 | Children's learning program |
| 67 | Jewelry |
| 68 | Interior Decoration |

TABLE 2

Example Advertiser classifications into industries

| Advertiser Name | Identifier Name | Nielsen Prod. Hierarchy |
|---|---|---|
| Charity | Charitable Organization | Product Category |
| Dental Insurance | Dental Services | Product Category |
| Investment Services | AMERIPRISE FINANCIAL INC | Subsidiary |
| Investment Services | CHARLES SCHWAB & CO INC | Subsidiary |
| Investment Services | E TRADE SECURITIES INC | Subsidiary |
| Investment Services | FIDELITY DISTRIBUTORS CORP | Subsidiary |
| Investment Services | Financial-Investment Services | Product Category |
| Investment Services | GAIN CAPITAL GROUP LLC | Subsidiary |
| Investment Services | INTERACTIVE BROKERS LLC | Subsidiary |
| Investment Services | SCOTTRADE INC | Subsidiary |
| Investment Services | SHAREBUILDER CORP | Subsidiary |
| Investment Services | SPEEDTRADER.COM INC | Subsidiary |
| Investment Services | TD AMERITRADE INC | Subsidiary |
| Investment Services | TRADESTATION SECURITIES INC | Subsidiary |
| Investment Services | UNITED SVCS AUTOMOBILE ASSN | Subsidiary |
| Power tools | Power Tools-Access | Product Category |

3. Obtain a set of product purchasers who have purchased a product in industry A, P(A) (step 320). For example, embodiments of the present disclosure may use data from 6.8 million persons who had previously bought products across 25 advertiser industries.

4. Enrich the set of product purchasers with consumer demographics (from step 305 and 325). For example, 3,500 or more demographic elements may be used in one embodiment.

5. Obtain data on the viewing audience of television media, which may generally include programs, but may include any contiguous set of video (step 330). Enrich the audience data with the consumer demographics (step 335).

6. Summarize the audience of programs by calculating an aggregated demographic profile $M_{j,d,v}(A)$ (step 350) using set top box person viewing data $q \in Q$ that may be captured from televisions comprising a viewing event for person on media $M_j(A)$.

7. Optionally perform a "lookalike expansion" on the set of product purchasers by matching the demographic profiles of the purchasers with demographic profiles of the viewers to find the best matching N>=1 persons in the television viewing population (step 345) as $P(A)_{d,v}$. This will find persons in the set top box TV viewing population who look similar to those historical purchasers based on their demographic characteristics. This may improve the buyer data quality, which can help to provide for good fidelity matching between the vector profiles. Look-a-like expansion does not need to be used if there are sufficient product purchasers.

8. Calculate a relevance score, between the product purchasers $P(A)_{d,v}$ and each ad airing $M_{j,d,v}(A)$. One calculation that can be used is a correlation coefficient. Often this relevance score is referred to as a tratio (step 355).

Exemplary embodiments of the present disclosure may further include using demographic enrichment of the viewer and purchaser data (steps 325 and 335) to possibly report on the demographic d and value v for any person p among the viewer and purchaser data.

III. Basic Television Relevance Reports

After defining industries and calculating relevance for ad airings within each industry according to exemplary embodiments of the present disclosure, exemplary embodiments of the present disclosure may generate a variety of reports.

A. Report 1: Most Relevant Ads

A Report showing Relevance by ad-program can be generated from a report by showing the following columns: (Advertising-Industry, TV-program, tratio)

An example of this report is shown in Table 3 below. Table 3 shows that career education ads on "MTV-Jersey Shore SSN4 Reunion" had the highest degree of audience match. It also shows that diet industry purchasers match the audience for Food Network programs such as "FOOD-Fat Chef" and "FOOD—Chopped."

TABLE 3

Most relevant programming placement for a selection of industries

| Ad | Program | Relevance Score |
|---|---|---|
| Career Education | MTV-JERSEY SHORE SSN4 REUNION | 0.616 |
| Career Education | MTV-JERSEY SHORE SSN 5 | 0.606 |
| Career Education | MTV-JERSEY SHORE SSN 4 | 0.605 |
| Career Education | MTV-JERSEY SHORE 2 | 0.605 |
| Career Education | MTV-JERSEY SHORE SSN 6 | 0.605 |
| Career Education | MTV-JERSEY SHORE SSN4 REU REC | 0.604 |
| Career Education | SYN-PUNK'D AT | 0.604 |
| Career Education | MTV-JERSEY SHORE 2B | 0.602 |
| Career Education | MTV-JERSEY SHORE | 0.601 |
| Career Education | VH1-LOVE AND HIP HOP 2 | 0.589 |
| Charity | FOXB-IMUS IN THE MORNING | 0.514 |
| Charity | WILD-PACK | 0.500 |
| Charity | ESP2-TENNIS: US OPEN SRS MEN L | 0.497 |
| Charity | RFD-CROOK & CHASE | 0.490 |
| Charity | MSNB-POLITICS NATION | 0.472 |
| Charity | ETV-GRAN CINE FRI | 0.470 |
| Charity | ETV-GRAN CINE THURS | 0.468 |
| Charity | GRN-YELLOWSTONE: BATTLE FOR LI | 0.467 |
| Charity | FOXB-VARNEY & COMPANY | 0.464 |
| Charity | FOXB-IMUS MUSIC SPECIAL | 0.463 |
| Cosmetics | BRAV-FASHION HUNTERS | 0.515 |
| Cosmetics | STYL-HOT LISTINGS MIAMI | 0.485 |

TABLE 3-continued

Most relevant programming placement for a selection of industries

| Ad | Program | Relevance Score |
|---|---|---|
| Cosmetics | BRAV-DONT BE TARDY | 0.484 |
| Cosmetics | STYL-E! NEWS | 0.478 |
| Cosmetics | STYL-WEDDINGS FROM HELL | 0.478 |
| Cosmetics | BRAV-RING LEADER, THE | 0.477 |
| Cosmetics | BRAV-K GRIFFIN: MY LIFE D-LIST | 0.476 |
| Cosmetics | BRAV-LIFE AFTER TOP CHEF | 0.475 |
| Cosmetics | STYL-FACE, THE | 0.475 |
| Cosmetics | LIFE-ON ROAD AUSTIN & SANTINO | 0.472 |
| Diet | FOOD-FAT CHEF | 0.454 |
| Diet | STYL-CLEAN HOUSE | 0.442 |

TABLE 3-continued

Most relevant programming placement for a selection of industries

| Ad | Program | Relevance Score |
|---|---|---|
| Diet | FOOD-CHOPPED | 0.434 |
| Diet | STYL-PROJECT RUNWAY | 0.425 |
| Diet | STYL-HOW DO I LOOK | 0.420 |
| Diet | FOOD-RACHAEL VS. GUY | 0.419 |
| Diet | FOOD-CUPCAKE WARS | 0.418 |
| Diet | DFH-DR. G: AMERICAS MOST SHOC | 0.414 |
| Diet | FOOD-ACE OF CAKES | 0.413 |
| Diet | TLC-SAY YES TO THE DRESS: ATL | 0.410 |

B. Report 2: Relevance by Industry

Exemplary embodiments of the present disclosure may include generating a report showing overall relevance trends in the TV industry. A report on overall relevance and pricing trends in the TV industry as a whole can be defined with showing the timeseries of (Date, AdvertisingIndustry, tratio, CPM)

An example of this report is shown in Table 4, below. The exemplary report in Table 4 may show relevance by industry, along with price information. Price enables the calculation of the value per dollar (or approximate cost per buyer) from advertising in each industry by calculating CPM/tratio. Such a report may show, for example, that it is expensive to go after luxury auto buyers, but less expensive to reach cosmetics or fitness program customers. CPM30 is defined as 1000 multiplied by the spot cost divided by impressions, and then scaled to an equivalent 30 second ad. The calculation is provided in the Glossary.

TABLE 4

Ad Relevance and Prices by Industry

|  | CPM 30 | T-Ratio | T-CPM30 | Impressions per Airing | Cost30 per Airing |
|---|---|---|---|---|---|
| Luxury auto | $12.94 | 0.229 | $56.47 | 447,697 | $5,792 |
| DIY investment | $11.78 | 0.212 | $55.62 | 402,442 | $4,740 |
| Truck Pickup | $11.13 | 0.196 | $56.86 | 484,196 | $5,391 |
| SUVs | $10.16 | 0.153 | $66.43 | 540,640 | $5,494 |
| Investment Services | $ 9.12 | 0.222 | $41.01 | 382,821 | $3,491 |
| Power tools | $ 8.14 | 0.231 | $35.25 | 394,389 | $3,209 |
| Term | $ 7.97 | 0.227 | $35.13 | 306,677 | $2,445 |
| Charity | $ 7.41 | 0.121 | $61.09 | 544,432 | $4,034 |
| High Income Credit Card | $ 7.23 | 0.178 | $40.67 | 321,503 | $2,323 |
| Life Insurance | $ 6.95 | 0.256 | $27.12 | 291,572 | $2,027 |
| Fitness Program/Club | $ 6.32 | 0.267 | $23.69 | 326,092 | $2,062 |
| Interior Decoration | $ 6.17 | 0.179 | $34.51 | 310,786 | $1,918 |
| Cosmetics | $ 6.15 | 0.127 | $48.53 | 469,170 | $2,885 |
| Diet | $ 5.73 | 0.133 | $43.09 | 306,175 | $1,755 |
| Technical colleges | $ 5.71 | 0.237 | $24.11 | 323,743 | $1,848 |
| Home Furnishings | $ 5.17 | 0.120 | $43.19 | 301,218 | $1,559 |

C. Report 3: Relevance by Network

Exemplary embodiments of the present disclosure may generate a report showing network relevance according to date, network and tratio, with the columns below: (Date, Network, tratio)

An example of this report is shown in FIGS. 4 and 5. According to these exemplary reports, it may be concluded that TV relevance as a whole has increased between 2010 and 2013 by about 0.5% per year. In addition, these exemplary reports suggest that in 2013 the networks with the most relevant ads were: MTV, GOLTV, SPD, CNBC, MILI, ESQR, MTV2, FOXB and GOLF (FIG. 5).

In FIG. 5, tratio was converted into a "5 star rating" showing effectively the percentile of tratio for each network. A score of 5 in FIG. 5 indicates that the tratio for the network was in the top 20$^{th}$ percentile of all networks for that year, and a score of 1 means it was in the lowest 20$^{th}$ percentile. More details about "star ratings"—which are used to provide a more human-readable version of metrics in these reports—is provided in the Glossary.

FIG. 4 indicates that of the broadcast stations in 2013, CW had the most relevant advertising, and Fox had the next most relevant advertising. FIG. 4 indicates that of the broadcast stations in 2013, CBS had the least relevant advertising.

Also based on the report in FIG. 4, it may be noted that approximately 40% of television ads have a relevance that is worse than random. Performance worse than random may be defined as reaching fewer product purchasers than might be reached if an ad were targeted randomly in placements on television.

In FIGS. 4 and 5, the ad relevance of each advertiser may be indicated by providing tratios alone or in combination with additional visual information. The additional visual information may include, for example, coloring or shading of grid cells.

D. Report 4: Least Relevant Ads

Exemplary embodiments of the present disclosure may generate a report showing the least relevant ads amongst a collection of media. This report can be generated by showing the following columns: (Industry, TV-program, tratio)

An example of this report is shown in Table 5. The report in indicates that (amongst other insights) (a) the most irrelevant ad for the luxury auto industry was TNT's "Charmed." T(b) The most relevant ad in the power tools industry was on Military Channel's "Quest for Sunken Warships.", (c) The most irrelevant ad for power tools ads were Women's Entertainment Network's "I Do Over" and "My Fair Wedding."

TABLE 5

Examples of Most and Least Relevant Ads

| Industry | Most Relevant Programs | tratio | Least Relevant Programs | tratio |
|---|---|---|---|---|
| Luxury auto | HDNET-AUTO TRADER | 0.546 | TNT-CHARMED | −0.473 |
| Luxury auto | HDNET-AMERICAN ICON - THE HOT R | 0.527 | TNT-SUPERNATURAL | −0.419 |
| Luxury auto | GOLF-GOLF IN AMERICA | 0.522 | TV1-HUGHLEYS | −0.419 |
| Luxury auto | ESP2-PTI SPECIAL | 0.517 | STYL-AMERICAS NEXT TOP MODEL | −0.413 |
| Luxury auto | ESP2-BOXING SERIES L | 0.513 | SYFY-URBAN LEGENDS | −0.390 |
| Luxury auto | GOLF-BIG BREAK XVI: IRELAND | 0.510 | TV1-AMEN | −0.380 |
| Luxury auto | GOLF-USGA | 0.506 | TRAV-DEAD FILES | −0.373 |
| Luxury auto | HDNET-MOTORWEEK | 0.505 | TV1-DIVORCE COURT | −0.370 |
| Luxury auto | ESPN-COLLEGE FOOTBALL PRIME L | 0.502 | TV1-MOVIE | −0.368 |
| Luxury auto | GOLF-HANEY PROJECT | 0.498 | BET-MY BLACK IS BEAUTIFUL 2 | −0.351 |
| Power tools | MILI-QUEST FOR SUNKEN WARSHIPS | 0.661 | WE-I DO OVER | −0.692 |
| Power tools | MILI-WINGS OVER VIETNAM | 0.659 | WE-MY FAIR WEDDING | −0.674 |
| Power tools | MILI-WINGS OF THE LUFTWAFFE | 0.654 | WE-SINBAD: ITS JUST FAMILY | −0.647 |
| Power tools | MILI-COMBAT TECH | 0.642 | OXYG-REAL HW ATLANTA | −0.645 |
| Power tools | MILI-CARRIER - FORTRESS AT SEA | 0.639 | WE-BRAXTON FAMILY VALUES | −0.639 |
| Power tools | MILI-NAZIS: OCCULT CONSPIRACY | 0.638 | WE-PLATINUM WEDDINGS | −0.635 |
| Power tools | MILI-DECISIONS SHOOK THE WORLD | 0.635 | BET-WENDY WILLIAMS SHOW, THE | −0.599 |
| Power tools | MILI-ULTIMATE GUIDE: PLANES | 0.632 | OXYG-BEST INK | −0.583 |
| Power tools | MILI-ANATOMY OF | 0.630 | OXYG-TORI & DEAN HOME SW HLYWD | −0.580 |
| Power tools | MILI-WORLD AT WAR | 0.627 | OXYG-AMERICAS NXT TOP MODEL | −0.578 |

IV. Sell-Side Optimizer

Figure 6:
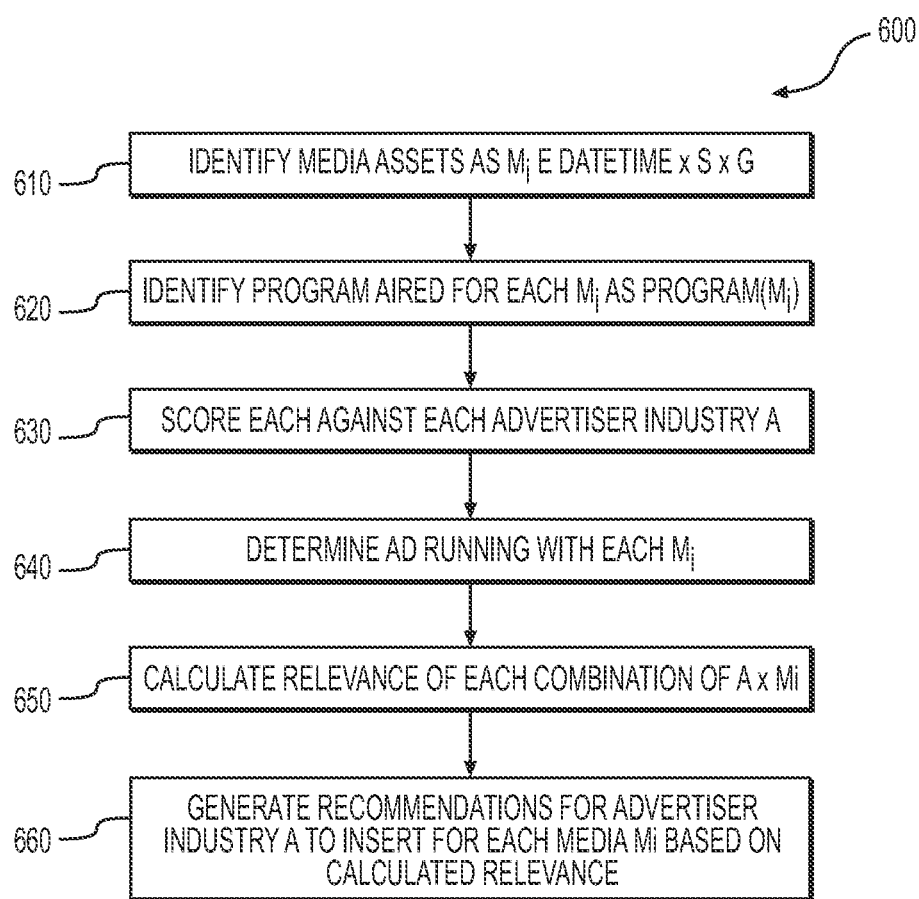
FIG. 6 depicts a flowchart for sell-side optimization, according to exemplary embodiments of the present disclosure.

Exemplary embodiments of the present disclosure may provide a sell-side optimizer that may enable TV networks to increase ad relevance and auction density. An exemplary method and algorithm for a sell-side optimizer is illustrated in the flowchart of FIG. 6. In order to provide such a sell-side optimizer, exemplary embodiments of the present disclosure may score every possible ad insertion defined across a set of industries A against every piece of inventory $M_i$:

In one embodiment, media $M_i$ can be defined as $$M_i \in DateTime \times S \times G \qquad \text{[Equation 1]}$$

where DateTime is a 30 minute time period during a broadcast week, S is Television Network, and G is geography, either DMA or National.

Equation 1 creates a Cartesian product of date-time, station, and geography for the week under consideration (step 610). A TV schedule lookup is then performed to find the appropriate program that would be airing during a given week, thereby associating a Program($M_i$) for each $M_i$ (step 620), scoring each media asset $M_i$ against every possible advertiser industry $A_j$ that could be inserted for that media (step 630), accessing or calculating the current ads that are running with each media asset $M_i$ (step 640), calculating the relevance of each current ad (step 650), and generating recommendations for the advertiser based on calculated relevance (step 660).

In another embodiment, media $M_i$ can be defined as $$M_i \in S \times P \times D \times H \times T \times G \times POD \times POS \times L \qquad \text{[Equation 2-1]}$$

where S is Station, P is Program, D is Day-Of-Week, H is Hour-Of-Day, T is Calendar-Time, G is Geography, POD is the Ad-Pod, POS is the Pod-Position, and L is Media-Length. Stations may include Broadcast and Cable stations and may be generally identified by their call-letters, such as KIRO and CNN. Geography may include National, Direct Market Association Areas, such as Miami, Fla. and Cable Zones, such as Comcast Miami Beach. An "Ad Pod" may be a term used to reference a set of advertisements that run contiguously in time during the commercial break for a TV program. "Pod position" may be a term used to reference the sequential order of the ad within its pod. "Media Length" may be a term used to reference the duration of the time segment in seconds—common ad lengths include 30, 15 and 60 second spots, where DateTime is a 30 minute time period during a broadcast week, S is Television Network, and G is geography, either DMA or National. Once again, advertiser industries can then be scored against the above media.

The use of "industries" rather than individual advertisers by exemplary embodiments of the present disclosure may provide one or more advantages. First, doing so may quantize the space of advertisers, and thereby reduce the cardinality of the optimization problem, so instead of 100,000 advertisers, the exemplary embodiments of the present disclosure may be able to calculate improved ad allocations using only several thousand industries. Also, data may not be available for all advertisers who are part of the pool being analyzed by the system. Therefore, by using industries, data for advertiser-industries in general can be used to help inform how ads should be allocated for particular advertisers, even in the purchaser data for those advertisers isn't available. If data for individual advertisers is available, then exemplary embodiments of the present disclosure, of course, may perform optimization with each individual advertiser's own data. However the definition of industries makes it possible to meaningfully optimize advertisers with or without individual data.

Exemplary embodiments of the present disclosure may include accessing or calculating the current ads that are running with each media asset $M_i$ in one or more ways. For example, exemplary embodiments of the present disclosure may include calculating the most frequent ad based on historical placements:

$$\text{CurrentAd}(M_i) = \text{MostFreqAd}(M_i) = A_j : \max \text{occ}(A_j) \qquad \text{[Equation 2]}$$

as the most frequent historical ad inserted into this media $M_i$. This can be accomplished by counting the most frequent ad by counting the number of occurrences of each ad $A_j$ in past airings of media $M_i$.

Alternatively, exemplary embodiments of the present disclosure may include setting CurrenAd($M_i$) to equal the ad which is currently planned to run in media placement $M_i$ based on known advertiser upfront and scatter purchases. This ad can be determined by linking the system to sales or inventory tracking systems which have information on which advertisers have bought particular placements.

Exemplary embodiments of the present disclosure may include providing one or more Sell-Side Optimizer decision support reports based on calculated relevance of each ad placement. Several example reports are described next:

Sell-Side Optimizer Functions

Some of the functions which Sell-Side Optimizer is able to compute are described below. The functions can be exposed to a user via a Graphical User Interface (GUI), via computer reports, via graphical data visualizations, via XML or other data technologies. We will show an example Graphical User Interface implementation that supports some of the functions described below following this section.

A. Most Relevant Inventory for an Advertiser

A list of recommended media by sorting inventory in order of tratio in order to provide guidance to an advertiser on how to reach the most buyers per impression, according to the equation:

$$M_i : \max_N \text{tratio}(A_j, M_i) \qquad \text{[Equation 3]}$$

Alternatively, exemplary embodiments of the present disclosure may include providing a list of recommended media by sorting inventory in order of tratio within particular CPM or cost thresholds in order to recommend media that is most relevant for the advertiser, according to the equation:

$$M_i : \max_N \text{tratio}(A_j, M_i) \text{ where } \text{CPM}(M_i) < C \text{ and } \text{Cost}(M_i) < \text{Cost} \qquad \text{[Equation 4]}$$

B. Most Economical Inventory for an Advertiser

Exemplary embodiments of the present disclosure may include reports which provide a list of recommended media by sorting inventory in order of the cost per targeted impression or tCPM in order to provide guidance to an advertiser on the most cost effective media for their ad, according to the equation:

$$M_i : \min_N tCPM(A_i, M_i) = \frac{CPM(A_j, M_i)}{tratio(A_j, M_i)} \qquad \text{[Equation 5]}$$

C. Agencies to Contact to Sell Inventory

Television Broadcasters or Publishers typically have to sell all of their inventory, and as an air date approaches, it becomes increasingly important to find a buyer. If a buyer cannot be found, the publisher will often give away the inventory in the form of bonus or in the form of a public service announcements. In such circumstances, publishers may want to know which advertisers to contact, in order of likelihood of purchase, to monetize their inventory.

Exemplary embodiments of the present disclosure may provide a list of recommended advertisers to contact by ordering the top advertiser industries for each media, according to the equation:

$$A_j : \max \text{tratio}(A_j, M_i) \qquad \text{[Equation 6]}$$

In addition to helping to connect to buyers, it may be in the publisher's interest to have more bidders on their market interested in their inventory. Auction theory suggests that as the number of bidders increase, so should the average price for the goods under auction. Therefore, increasing awareness of desirable media with potential buyers may increase auction density. FIGS. 15, 16 and 17 show examples of a graphical user interface which shows the advertisers who are most relevant for a particular television spot.

D. Inventory that Will be Higher Performing than Another Network's

Publishers are in competition with other publishers, and may desire to make the case to an advertiser that the advertiser should buy the publisher's inventory rather than someone else's. Exemplary embodiments of the present disclosure may include providing relevance scores in order to enable a publisher to compare their inventory to programs on other networks in order to show which of their inventory are better targeted or have better value per dollar. These may allow the publisher to provide comparisons which are customized for each advertiser's industry.

E. Substitutes for Unavailable Inventory

Similarly, exemplary embodiments of the present disclosure may include providing relevance scores in order to enable a publisher to compare their available inventory to a particular program that is unavailable in order to recommend available ad placements which are as good or better than the requested ad placement, both in price and targeting, according to the equations:

$$M_i : \max_N tratio(A_j, M_i) \geq tratio(A_j, M_k) \forall k \quad \text{[Equation 7]}$$

$$M_i : \min_N tCPM(A_j, M_i) \leq tCPM(A_j, M_k) \forall k \quad \text{[Equation 8]}$$

F. Maximum Increases in Relevance

A publisher may have flexibility when scheduling each ad. Advertisers may buy ad packages in rotations, which represent time ranges when each ad is to be aired. Accordingly the publisher may be able to optimize ad placement within those rotations. Exemplary embodiments of the present disclosure may include providing a list of ad insertions that would result in the greatest increase in overall relevance, according to the following equation:

$$A_j, M_i : \max(tratio(A_j, M_i) - tratio(MostFreqAd(M_i), M_i)) \quad \text{[Equation 9]}$$

V. Yield Maximization: Advertiser Pricing

Exemplary embodiments of the present disclosure may include enabling a publisher to improve yield by charging more appropriate prices for the publisher's inventory. There are two primary markets for selling inventory in television: "upfront" and "scatter." The upfront market generally occurs each September and is a large event where new programs and premium media is sold in a short period of time. The scatter market occurs continuously throughout the year and involves any media that was not sold during the upfront market.

Price setting on scatter inventory may be similar to airline ticket prices. As demand for inventory goes up, price should also go up. As an air-date approaches, price may have to drop to ensure that a sale occurs. If the inventory is left unsold then the publisher may lose revenue.

In trying to set an effective price for their media, the publisher may desire to set a price for each advertiser which is low enough to clear, but which also is high enough that the publisher could generate a reasonable yield. In setting the price, publishers may set a single price for their media in what is known as a "rate card." The rate card may be published weekly, for example.

However, a publisher may desire to have a more dynamic rate card price. Knowledge of the advertiser, their interest in the media, and their historical prices paid, may inform such dynamic pricing. Thus, the publisher may avoid over-discounting on media which the advertiser would want to buy. Likewise, the publisher may determine to lower the price of the media that is not ideal for an advertiser.

Figure 7:
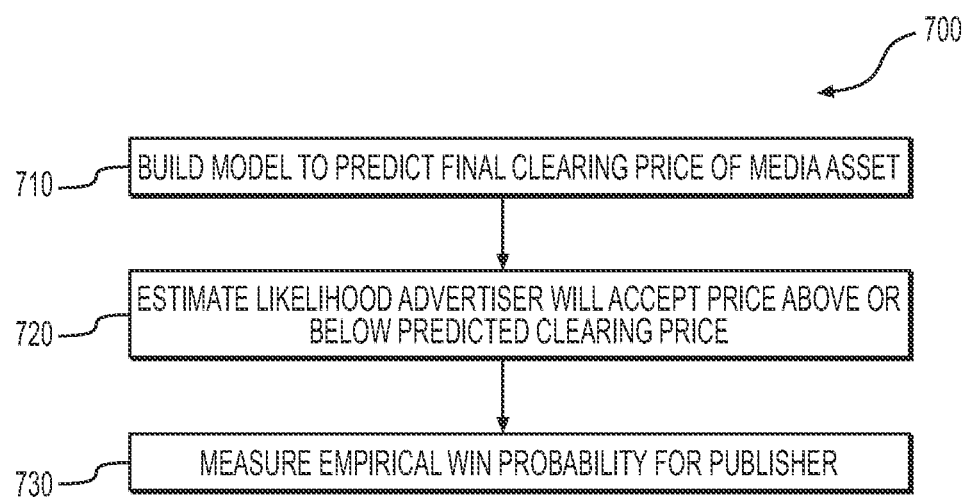
FIG. 7 depicts a flowchart for advertiser yield maximization, according to exemplary embodiments of the present disclosure.

In order to provide such dynamic pricing, exemplary embodiments of the present disclosure may include providing a yield maximization model that may predict the expected clearing price $CPM30(A_j, M_i)$ based on advertiser historical prices paid and relevance to the advertiser. An algorithm for providing a yield maximization model is illustrated in FIG. 7.

A yield maximization model according to exemplary embodiments of the present disclosure may be provided according to the following equation (step 710):

$$CPM30(A_j, M_i)^* = \quad \text{[Equation 10]}$$

$$\Sigma w_1 \cdot HistCPM30(m_i) \cdot HistDiscount \quad \text{[Equation 11]}$$

$$+ \Sigma w_2 \cdot CPM30(m_i) \quad \text{[Equation 12]}$$

$$+ \Sigma_{m_i} w_3 \cdot HistCPM30(A_j, m_i) \cdot HistDiscount(A_j) \quad \text{[Equation 13]}$$

$$+ \Sigma w_4 \cdot CPM30(A_j, m_i) \quad \text{[Equation 14]}$$

$$+ \Sigma_{m_k} w_5 \cdot |tratio(A_j, m_i) - tratio(A_k, m_k)| \cdot CPM30(A_j, m_k) \quad \text{[Equation 15]}$$

$$+ \Sigma w_6 \cdot CoView(m_i, m_k) \cdot CPM30(A_j, m_k) \quad \text{[Equation 16]}$$

In Equation 10, $W_1$-$W_6$ are predetermined numerical weights.

Equation 11 may represent the historical price, such as from SQAD, Standard Media Index, and others—for a media pattern $HistCPM30(m_i)$ that matches the inventory that is being priced $M_i$ adjusted by an overall historical adjustment. For example, if $M_i$ is CNN on Tuesday at 8 pm is to be priced, then $m_i$ of CNN on a weekday in prime time would match.

Equation 12 may represent the historical clearing price for this media pattern $CPM30(m_i)$.

Equation 13 may represent the $HistCPM30(A_j, m_i)$ that the advertiser has logged for patterns of media $m_i$ that match the inventory being priced $M_i$, scaled by the typical percentage off historical price that this advertiser historically achieves $HistDiscount(A_j)$.

Equation 14 may represent the historical actual clearing price for a pattern of media that has similar tratio or audience composition, scaled by the similarity.

Equation 15 may represent the historical actual clearing price for a pattern of media that has similar a high probability of having the same set top box persons viewing the pattern as the media being priced Equation 16 may represent the historical actual clearing price for a pattern of media that matches the inventory being priced.

Exemplary embodiments of the present disclosure may train the above model on historical observations of inventory M, advertiser A, SQAD price SQADCPM30, and actual clearing price CPM30.

VI. Yield Maximization: Advertiser Win Probability Landscape/Negotiation Support Tool After building the yield maximization model above, exemplary embodiments of the present disclosure may include estimating whether the advertiser is likely to accept a price which is above or below their expected clearing price (step 720). Based on such an estimate, the publisher may use this to inform their negotiation strategy. For example, if the on-air date is approaching, then the publisher may desire to sell their inventory rather than have it go unsold. In such a circumstance, the publisher may, for example, use the yield maximization model provided by exemplary embodiments of the present disclosure to determine that they should drop their price so as to increase their win probability with the advertiser. The yield maximization model provided by exemplary embodiments of the present disclosure may thus enable the publisher to possibly avoid over-discounting their inventory by allowing the publisher to determine that an advertiser is likely to buy the inventory at the reduced price. In order to calculate this win probability landscape, exemplary embodiments of the present disclosure may include measuring the empirical probability of win versus difference from expected (step 730), for example, according to the equation:

$$Pr(Z|x \cdot CPM30(A_j, M_i)^*) = \qquad \text{[Equation 17]}$$
$$\frac{occ}{N}: CPM30(A_j, M_i) \geq x \cdot CPM30(A_j, M_i)^*$$

where occ is the number of observations of an advertiser paying more than x·CPM30($A_j$, $M_i$)* and N is the total number of observations.

VII. Sell-Side Optimizer: GUI Implementation

Figure 14:
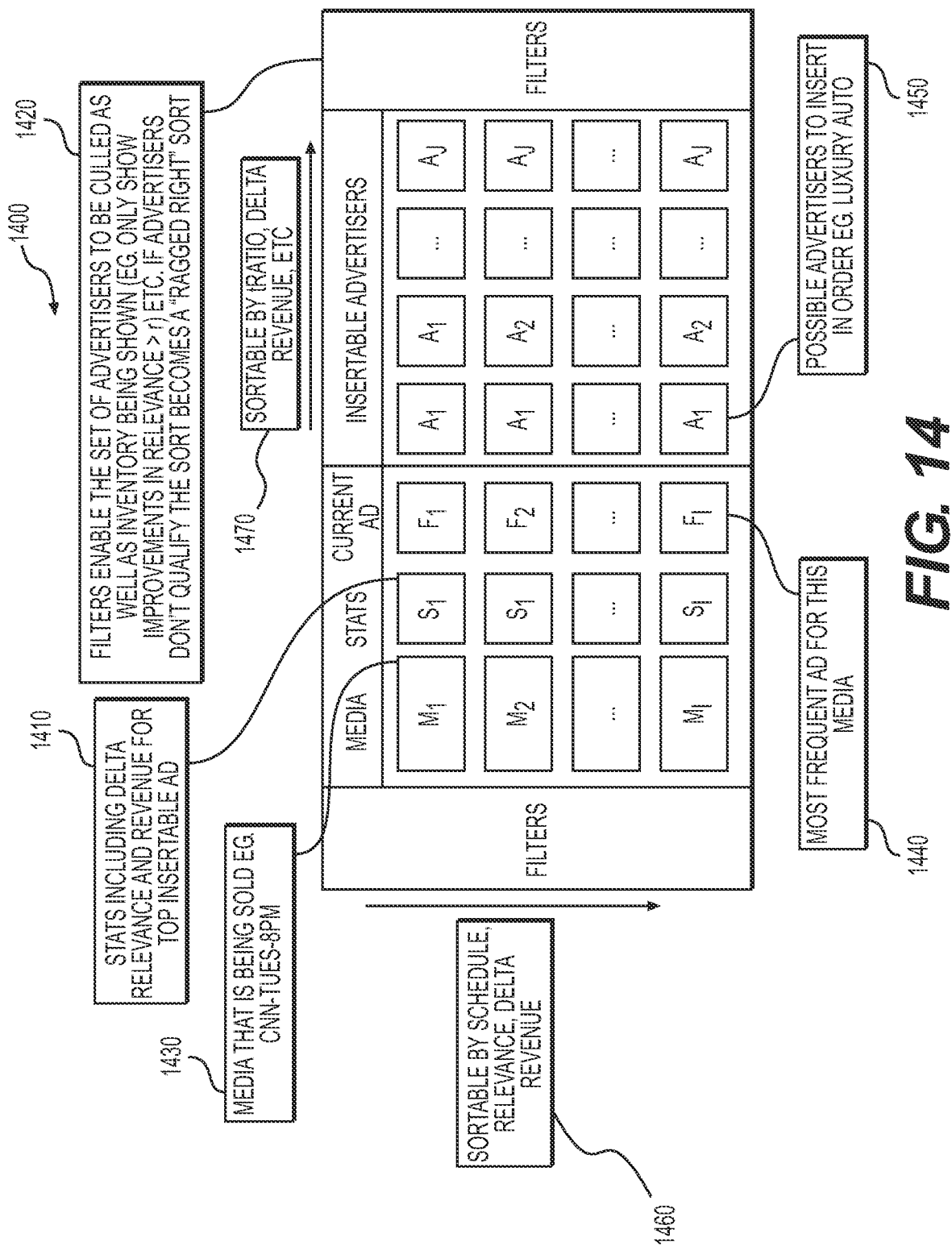
FIG. 14 depicts a sell-side graphical user interface (GUI), according to exemplary embodiments of the present disclosure.

Exemplary embodiments of the present disclosure may further include providing a graphical user interface (GUI) to enable a network to view a list of advertisers that may be inserted against their inventory, as shown in FIG. 14.

The GUI may be organized into a grid which has TV inventory (1430) running down the page, and candidate advertisers who could be inserted against media inventory running across the page (1450). A series of linked filters may be available on the left and right-hand panes (1420). The GUI may support two-dimensional sorting. Vertical sorting may enable the sorting by, for example, schedule, cost of media, gain in relevance, relevance, or units available, etc. (1410), so that a network may quickly review which inventory to address. Horizontal sorting may enable sorting by advertisers who could be inserted into each position (1450) by, for example, tratio relevance, or other metrics. The GUI may further provide the current or most request ad for each media (1440).

VIII. Sell-Side Optimizer: Screenshots Showing Example Use Cases

The Graphical User Interface (GUI) provided by exemplary embodiments of the present disclosure may be used to achieve a number of objectives as described below:

A. Best Media for an Advertiser

FIG. 19 shows a report that may be generated through the GUI provided by exemplary embodiments of the present disclosure relating to an American Broadcasting Corporation (ABC) Saturday schedule. A network may use such a report to determine the best inventory to recommend for an SUV advertiser.

In FIG. 19, the relevance of each advertiser may be indicated by providing tratios alone or in combination with additional visual information. The additional visual information may include, for example, icons and the coloring or shading of grid cells. As shown in FIG. 19, an SUV advertiser would reach few buyers in "The Chew" or "General Hospital," (1 pm-2 pm Saturday) or even "Shark Tank" or "Last Man Standing" (8 pm-10 pm). However they would do well in College Football from 3 pm-6 pm. Such a report may enable the advertiser to fine-tune their rotation boundaries to include football but avoid the other programming.

B. Advertisers to Contact Via Grid GUI

The GUI provided by exemplary embodiments of the present disclosure may be used to gain insight into the list of advertisers who may be interested in a particular media placement.

FIG. 11 shows a report generated for Discovery Channel's Animal Planet. The report in FIG. 11 was generated by sorting by schedule (vertical sort), and advertiser tRatio descending (horizontal sort). As shown in FIG. 11, the ad relevance of each advertiser may be indicated by providing tratios alone or in combination with additional visual information. The additional visual information may include, for example, icons and the coloring or shading of grid cells.

As shown in FIG. 11, in the early morning, "Music players" would be best to insert since that appeals to young people, and young people tend to be up in the early mornings. If that advertiser could not participate, then "Online Education," "Auto," and "Trucks" would be next in order of relevance and so would be next to contact to sell the inventory.

As shown in FIG. 11, there may be changes in recommended advertisers due to the time of day. For example, "Fitness" becomes the most relevant ad at about 6 AM, and then "Senior Life Insurance" around 11 AM and noon. The shift to "Senior Life Insurance" may relate to daytime viewing audience being more predominantly elderly. The report further indicates that if no interested advertiser could be found for "Senior Life Insurance" then the next advertisers of interest in order would be "Family Life Insurance," "Term Life Insurance," and "Dental Insurance," which are all products that may be favored by advertisers targeting more mature viewers.

FIGS. 15-17 show another report generating GUI that may be provided by exemplary embodiments of the present disclosure to generate an advertiser contact list.

The GUI shown in FIGS. 15-17 may allow a user to select media via a drop-down to select, for example, the network, day, and hour. The GUI may then return a list of the advertisers who may be interested in this media, and whom could be contacted to sell the inventory. The information that may be provided for each advertiser may include their historical spend and the agency who is managing their inventory. In addition, the information that may be provided for each advertiser may include an expected clearing price which is the price at which the listed advertiser may be willing to purchase the media placement.

In FIG. 15, tratio is the match between advertiser's population and the audience of the program (1510). Music players and services are shown as the top advertisers on MTV due to the demographics, while colleges and online education would also be interested in purchasing TV spots (1540). This may be attributed to a predicted 9.09 clearance price for the music companies and a predicted 8.82 clearance price for the technical colleges (1530). In addition, the report shows how much each agency has historically spent (1520). This can be useful for looking for agencies that are likely to buy in the future.

In FIG. 16, second-hand clothing sellers, interior decoration/home furnishing, and education may be among the advertisers predicted to be interested in buying the media placement. In addition, for advertisers who do not have a good audience match (i.e., a low tratio), exemplary embodiments of the present disclosure may offer prices that are lower than the historical CPM clearance rate.

Finally, in FIG. 17, "Life Insurance" and "Luxury Autos" are indicated top advertisers who would be interested in this inventory (1710). Furthermore, exemplary embodiments of the present disclosure may indicate that that AARP may pay more because the media is very well targeted to their audience (1720). For each advertiser, the report may provide an agency to contact that is the entity executing the buys on behalf of the advertiser.

C. Schedule Improvements to Increase Ad Relevance

FIGS. 8 and 9 depict an example of a TV schedule for Music Television (MTV) such as may be provided by exemplary embodiments of the present disclosure. In FIGS. 8 and 9, the tratio of each ad may be indicated by providing the tratios alone or in combination with additional visual information. The additional visual information may include, for example, coloring or shading of grid cells.

As shown in FIGS. 8 and 9, currently "Cosmetics" industry ads are being aired against "Ridiculousness" in the early morning hours including midnight and 5 am. The relevance scores shown in FIGS. 8 and 9 indicate that "Cosmetics" scores a tratio as low as 0.092 in these slots, whereas the highest tratio ad industry is "Music." "Cosmetics" may score poorly for these programs because Ridiculousness appeals primarily to young males, but does not appeal to young females. Instead, as shown in FIGS. 8 and 9, "Music," with a tratio as high as 0.493 in these slots, would be a more relevant ad for this audience.

As shown in FIGS. 8 and 9, MTV is also airing "Charity" ads for the movie "Step Up." However, the relevance scores shown in FIGS. 8 and 9 indicate that "Education online" would be a better ad to insert. Here, the buyers of "Education online" are predominantly young and female, thus better matching the viewers of "Step Up."

FIGS. 10A and 10B depict the same MTV schedule but in a grid view such as may be provided by exemplary embodiments of the present disclosure. Here, exemplary embodiments of the present disclosure may show multiple advertisers, and the ad relevance of each advertiser may be indicated by providing tratios alone or in combination with additional visual information. The additional visual information may include, for example, coloring or shading of grid cells. The additional visual information may make it possible to discriminate "blocks" and "striations" of color or shading in which ad relevance tends to follow the programs that are being aired. For example, in example shown in FIGS. 10A and 10B, "Ridiculousness" may appeal to one set of viewers, and "16 and Pregnant" to another. Different ads may be relevant for each program.

D. Largest Gains in Ad Relevance

FIG. 18 shows a TV schedule for WGN such as may be provided by exemplary embodiments of the present disclosure. As shown in FIG. 18, the report provided by exemplary embodiments of the present disclosure may be sorted in order of largest gains in relevance. As shown in FIG. 18, the ad relevance of each advertiser may be indicated by providing tratios alone or in combination with additional visual information. The additional visual information may include, for example, icons and the coloring or shading of grid cells.

As shown in FIG. 18, after sorting by the largest increase in relevance, the report indicates that the largest potential gain would be by replacing "Online Education" ads against WGN News at Nine. The WGN News tends to be viewed by an older audience, and so "Online Education" may be poor match since it appealed to mainly young people. Instead a "Power tools" ad would have been a better choice to air with WGN News at Nine.

The next highest relevance improvement, as shown in FIG. 18, would be from optimizing the ad for Futurama at 3 am. At this time in the morning, the only people watching tend to be very young. In addition, Futurama is a program that is viewed by younger people. Yet a Colonial Penn Life Insurance ad was the one most frequently run. As shown in FIG. 18, a "Music Player" ad may have been more effective in this slot.

In addition, FIG. 12 shows another report that may be provided by exemplary embodiments of the present disclosure, here showing possible ad insertions by tratio difference between current advertisement and optimal descending. For example, on Animal Planet, "Dogs 101" airs "Mitsubishi Outlander trucks" most frequently. However a better ad to insert would be "Fitness" (the heart-shaped icon). "Dogs 101" appeals to younger females, and so truck ads have poor relevance for this audience.

FIG. 13 shows another report that may be provided by exemplary embodiments of the present disclosure, here showing the relevance for one particular advertiser (weight-loss). This report indicates that the audience for "Dogs 101" may be a close match to the people who purchase weight-loss products, as might "Too Cute!" However "Gator Boys" may not be viewed by a relevant audience and so this ad may not be irrelevant to viewers of that program.

In FIGS. 12 and 13, the ad relevance of each advertiser may be indicated by providing tratios alone or in combination with additional visual information. The additional visual information may include, for example, icons and the coloring or shading of grid cells.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

IX. Glossary of Terms and Calculations

The following section will provide more detail about the various terms and calculations used throughout this disclosure. These include terms such as tratio, CPM, CPM30, tratio_positive, tCPM30, and others. It also provides more detail about how industries are defined including an example industry.

tratio tratio measures how well targeted are advertisements. For example, let's say that one advertiser is placing "Power tools" ads on CWs "Vampire Diaries." Vampire Diaries is viewed by younger, female audience, where-as power tools are purchased by older males. This ad placement is intuitively poorly targeted—the ad product and the viewing population are completely different. In contrast, let's say that another advertiser placed their "Power Tools" ad on HIST's "Top Gear." The audience viewing Top Gear tend to be male, older, handymen. The "Power Tools" product would hit a lot more targets per impression. tratio is a per impression measure. A well-targeted ad would hit a potential buyer every impression. Of course in practice it is more common to reach a potential buyer every thousand impressions or more. Because it is a per impression measure, this means that shows that have smaller audiences are not penalized. For example, one could try to target "American Idol" to reach handymen. However, in order to reach those Handymen, the advertiser is having to buy millions of impressions of people that are not in the right target. Therefore, we find it useful to have a per impression measure that indicates buyer concentration. This simply indicates how rich each program is in terms of the buyer concentration. In many ways, rather than paying for impressions, advertisers could essentially pay for buyers, and the buyers per million simply conveys the value per impression of the media.

tratio can be calculated several ways, however a simple definition that we can use in one embodiment is it is the correlation coefficient between the demographic vector of purchaser demographics and audience demographics in a media program. Tratio is a number from −1 . . . 1. The correlation coefficient measures how many sums of squares in the shape of the target vector, are matched by the media vector. The critical benefit of this metric is that it is UNIVERSAL, GLOBAL, and COMPARABLE between advertisers, industries, and other factors. Under this scheme, a +0.5 in one industry means a certain amount of sums of squares accounted for between the target and media vector. In another industry, a +0.5 may be achieved with different variable values, but means the same thing in terms of how good is the match. It does not need to take into account the number of buyers, which vary from one product to another, and vary in terms of the potential universe of buyers, or the brand's effectiveness in advertising to-date.

The tratio is an absolute scale, normalized number from −1 . . . 1. Three cases are of special interest:
a. +1 indicates that the media being purchased is a perfect match for the target.
b. −1 indicates that the media being purchased is the opposite of what the advertiser should be purchasing. For example, say that the advertiser's product is "senior life insurance," which is life insurance that seniors purchase late in life to defray burial costs. A −1 could occur if the advertiser is targeting Cartoon network or MTV which are viewed by very young people, when in fact they should be targeting elderly people.
c. 0 Indicates that the media being purchased is effectively random. Because of the normalization regime, 0 means that the vector is effectively a match for the average of US population.

Because of the universality of the metric, we can use it to report on overall TV targetedness, and compare different industries to see how their natural levels of targeting vary.

We will talk briefly about TRPs and how they are different from tratio. Age-gender Target Rating Points (TRPs) are a traditional method for measuring targeting on television. This works by counting the number of persons with the desired age-gender and dividing by total population. For example if the target was females 25 to 54, we would count the number of persons who were female and 25 to 54 and then divide by population. However TRPs have several limitations that effectively mean that they are a bad fit when working with Set Top Box data.
a. The most problematic issue for TRPs is that the definition of the actual target is not known (e.g. how did we come up with "females 25 to 54"? TRPs are agnostic on exactly how the target is defined; in contrast the STB methods we use will automatically identify the target).
b. A second issue is age-gender TRPs use very few variables (i.e. just age and gender). STB methods are able to use thousands of variables for matching.
c. A third issue is that these are a conjunctive expression (e.g. Female AND "25 to 54"), and measure a target as either in or out (If you're "Female" AND "25 to 54" we score you as a 1 and 0 otherwise). This may be okay when using a small number of variables such as age and gender, but causes problems when working with high-dimensional data. Already with just age and gender, the total population drops from 100% to about 1%. Imagine what would happen if we add a third variable? Or a fourth? The number of persons matching on all of these demographics quickly drops to almost zero. It is possible to have thousands of descriptive demographic variables including "diabetes interest", "NASCAR spectator sports interest", "occupation=self-employed blue collar", and so on. If we create a Boolean and expression with all of these variables, we'll find that almost nobody is left who will match on exactly every variable. In order to work in practice, we need to use a method that is able to handle these high-dimensional spaces. Therefore we have to move from a hard in/out definition, to one which uses similarity, and then can utilize thousands of comparison measurements.

tratio_positive

In order to use tratio for many graphs and analyses, we will use a more robust measure called tratio_positive. This is defined as follows:

$$Tratio\_positive = \max(tratio, 0.05)$$

$$tCPM\_positive = CPM/tratio\_positive$$

This measure excludes negatively targeted media from consideration, and focuses on positively targeted media. We will tend to use tratio_positive in most analyses because it is more robust and allows us to work with a positive number. For example, an advertiser might have an average tratio of −0.20. However, they may have advertised some media at 0.10 and 0.20. We ignore the negatively targeted airings set those to 0.05. The resulting score focuses on the positive airings.

Cost or Spot Price

Spot prices are the prices that advertisers pay to advertise their media. Because advertisers use different media lengths (15 second, 30 second, 60 second and 2 minute ads), we "equivalize" the media to the price of an equivalent 30 second standard advertisement (30 second is the most common ad length). This is calculated by taking CPM30=CPM/(30/medialength) and we refer to this as the "Equivalized Cost Per Thousand" or CPM30. For example, if an advertiser has a 60 second ad and it cost $1000, then the 30 second equivalent ad would have a spotcost of $500.

CPM

Cost per thousand impressions. This is often used when referring to television advertising prices.

CPM30

Different advertisers use different lengths of advertisements. Some advertisers use 15 second, 30 second, 60 second and 120 second advertisements. We have found that generally the cost of these ads scales linearly with the number of ad seconds. In order to produce a measurement of CPMs, we have to standardize to a particular media length. We do that by setting 30 second ads as our standard.

$$CPM30 = CPM/(medialength/30)$$

Every airing in the United States is tracked, and an estimate of its clearing price is made. That estimate is often referred to as the "rate card rate". We surface these rate card rates, along with Nielsen quoted impressions, for every airing. This gives us the Cost and Impressions. Finally, we then apply our targeting measure of buyers per million.

tCPM30 tCPM30 is the cost per targeted impression, and indicates how cost effective is a targeted TV campaign. Lower tCPM30 indicates better value per dollar. Higher tCPM30 means worse value per dollar. tCPM30 is calculated as CPM30/tratio Star Ratings Star ratings are a convenient notation for indicating how good or bad a particular campaign is performing. In general, star ratings are a 5 star scale, where each star is equal to a $20^{th}$ percentile. For example, an advertiser with 1 star means that they are performing in the lower $20^{th}$ percentile of the group of comparable advertisers. An advertiser with 5 stars indicates that they are performing in the $80^{th}$ percentile.

In order to create star ratings that go across industries, we have to take into account that each industry has different tratios and tCPMs. In each industry the agency's tCPM is compared against the average for the industry, and converted to standardized units of how much higher or lower they are from the industry average.

For example, if the mean tCPM for the industry were 20, standard deviation was 10, and the agency had a tCPM of 10, then we would convert the agency's performance into standardized units of $-1.0$; meaning that the agency was executing a tCPM that was 1 standard deviation below the norm for the industry. We calculate these standardized discrepancies for each industry that an agency participates in. We then average the discrepancies to give a final standardized score. Let's say that the agency received standardized scores of $+0.5$, $-1.0$, $-1.5$ in three industries—we then average those to produce $-1.0$. The final step for star ratings is that the stars are assigned based on the rank of the agency compared to all other agencies. Let's say that there were 50 agencies, and the agency in question scored $-1.0$, and this meant that it was the $8^{th}$ best agency out of 50. We then would assign the company 5 stars out of 5, since it is ranked ahead >40 of the agencies—i.e. it is in the top $20^{th}$ percentile.

Upper and Lower Bounds

Upper and lowers show the upper $20^{th}$ percentile and lower $80^{th}$ percentile values. These are calculated by (a) summarizing agency-advertiser performance for a given day as an average tratio, tCPM, CPM, and so on, (b) taking a centered moving average for 90 days prior and 90 days after the current day, (c) reading off the $20^{th}$ and $80^{th}$ percentile for values over this period of time.

Moving Averages

Most timeseries are centered moving averages. Typically tratio, tCPM and CPM measurements are summarized to averages for the day, and then these are blended with the tratio, tCPM and CPM measurements for 90 days prior and 90 days after the current day. We use moving averages because advertisers typically go on and off the air, and we want to build up a general picture of the behavior of the advertisers.

Methods for Handling Low Data Regions

There are situations in which there may be very little data for a particular agency-advertiser. For example, the centered moving average takes 90 days before and 90 days after the present. However, let's say that we are approaching the end of the timeseries, and we may have 20 days before present, and 0 days after. When that occurs, the system will automatically exclude this data point because of low data availability.

Industry Definition Details

Industry Definition

A wide variety of companies advertise on television. However there are big differences between financial services and exercise equipment companies—different people buy these products and so advertisers need to go after different TV media. In order to measure their targeting and CPMs, we need to be able to segment TV advertisers into different groups or industries. We define the following for each industry:

II. Product

This is the product that the companies in this space. This ranges from life insurance, to power tools, to air travel. An example set of industries are defined in table A. This is an excerpt from a table called Advertiser.Advertiser, and each Advertiser defined here (with JobID as the primary key) represents a "collection" of airings that belong to a variety of companies.

TABLE A

Advertiser.Advertiser table showing several industries that have been defined.

| JobID | Advertiser Name | Source Key | Advertiser Type | Airings To Pull | Airings available | Processing | Local | Primary PanelID | Airing Count Processing |
|---|---|---|---|---|---|---|---|---|---|
| 1 | Charity | 110382 | Industry | 100000 | 497455 | 0 | 0 | 11 | 0 |
| 2 | Diabetic Health insurance | 110462 | Industry | 100000 | NULL | 0 | 0 | 11 | 0 |
| 3 | Diet | 110417 | Industry | 100000 | 257311 | 0 | 0 | 11 | 0 |
| 4 | Dental Insurance | 110406 | Industry | 100000 | NULL | 0 | 0 | 11 | 0 |
| 5 | Home Furnishings | 110401 | Industry | 100000 | 264864 | 0 | 0 | 11 | 0 |
| 6 | Investment Services | 110528 | Industry | 100000 | 711295 | 0 | 0 | 11 | 0 |
| 7 | Life Insurance | 110402 | Industry | 100000 | 229197 | 0 | 0 | 11 | 0 |
| 8 | Music | 110254 | Industry | 1000000 | 35023 | 0 | 0 | 11 | 0 |
| 9 | Power tools | 10023 | Industry | 100000 | 107493 | 0 | 0 | 11 | 0 |
| 10 | SUVs | 110347 | Industry | 100000 | 977988 | 0 | 0 | 11 | 0 |

III. Target Buyer Population

This is a set of persons who have bought the product in question. For example, if life insurance is the industry, the persons purchased a life insurance policy. After we create the target buyer population, we can report on the demographics of that population and where they are on TV.

In our database schema we represent these collections of product purchasers under a key called a sourcekey. This is a unique identifier that refers to the population of buyers. Table B shows an example of product purchasers unified under a particular sourcekey.

TABLE B

PersonSource table. Product purchasers (persons) identified as belonging to a particular sourcekey.

| Source Key | Person Key | Create Date | Acquisition Date | Churn Date | Customer ID |
|---|---|---|---|---|---|
| 110424 | 10532089 | 14:22.1 | 12/29/11 12:00 AM | NULL | a |
| 110424 | 10532146 | 26:15.1 | 2/14/98 12:00 AM | NULL | b |
| 110424 | 10532158 | 14:22.1 | 4/20/13 12:00 AM | NULL | c |
| 110424 | 10532187 | 26:15.1 | 6/10/04 12:00 AM | NULL | d |
| 110424 | 10532395 | 14:22.1 | 12/29/11 12:00 AM | NULL | e |
| 110424 | 10532513 | 14:22.1 | 1/3/12 12:00 AM | NULL | f |
| 110424 | 10532573 | 26:15.1 | 2/14/98 12:00 AM | NULL | g |
| 110424 | 10532580 | 14:22.1 | 2/29/12 12:00 AM | NULL | h |
| 110424 | 10532674 | 26:15.1 | 2/14/98 12:00 AM | NULL | i |
| 110424 | 10532713 | 14:22.1 | 8/27/12 12:00 AM | NULL | j |

TABLE C

Person Table. The persons are anonymous.

| Person Key | Name | City | State/Province | Zip/PostalCode |
|---|---|---|---|---|
| 1 | 1 | Greeley | CO | 80634 |
| 2 | 25 | Cottontown | TN | 37048 |
| 3 | 32 | COLUMBIA | SC | 29209 |
| 4 | 411 | Pine Hill | NJ | 08021 |
| 5 | 51 | ALMIRA | WA | 99103 |
| 6 | 6333 | MONTICELLO | KY | 42633 |
| 7 | 74 | FALL CREEK | WI | 54742 |
| 8 | 82 | PHILADELPHIA | PA | 19111 |
| 9 | 91 | MILLEN | GA | 30442 |
| 10 | 10 | Beaumont | TX | 77706 |

TABLE D

Demographics Table. This is a list of demographics supported by the system.

| DemographicsID | Demographics Name |
|---|---|
| 23 | Allergy Related Interest |
| 24 | Arthritis, Mobility Interest |
| 25 | Health - Cholesterol Focus |
| 26 | Diabetic Interest |
| 27 | Health - Disabled Interest |
| 28 | Orthopedic Interest |
| 29 | Senior Needs Interest |
| 30 | PC Internet Connection Type |
| 31 | Single Parent |
| 32 | Veteran |
| 33 | Occupation - Professional |

TABLE E

DemographicsValue table. This is a list of variables for each demographic. For example, for something like "age = 18to20", "age" is the demographic, and "18to20" is the demographicvalue.

| Demographics Value ID | Demographics ID | Demographics Value Name |
|---|---|---|
| 91 | 30 | Cable Internet |
| 92 | 30 | DSL Internet |
| 93 | 30 | Dial-Up Internet |
| 96 | 33 | Occupation - Professional |
| 97 | 33 | Architect |
| 98 | 33 | Chemist |
| 99 | 33 | Curator |
| 100 | 33 | Engineer |
| 101 | 33 | Aerospace Engineer |
| 102 | 33 | Chemical Engineer |

TABLE F

PersonDemographicsMap Table. This notes a demographic trait that each person has.

| Person Key | Demographics ID | Demographics Value ID |
|---|---|---|
| 10174988 | 14 | 76 |
| 10174988 | 44 | 55953 |
| 10174988 | 47 | 539 |
| 10174988 | 58 | 55972 |
| 10174988 | 63 | 660 |
| 10174988 | 65 | 662 |
| 10174988 | 84 | 681 |
| 10174988 | 101 | 695 |
| 10174988 | 116 | 712 |
| 10174988 | 134 | 764 |

TABLE G

SourceVariableValueProfile. The above table is an aggregation of the product purchaser demographics, and for each demographic-demographicvalue, it calculates a percentage of the time that the trait exists in the population defined by sourcekey, and then translates that into a z-score to give a measure of how unusual this percentage is compared to the US population.

| Source Key | Demographics ID | Demographics Value ID | ZScore |
|---|---|---|---|
| 10021 | 93 | 56025 | 0.683761948 |
| 10021 | 93 | 56026 | 0.968439159 |
| 10021 | 93 | 56027 | 0.204178975 |
| 10021 | 93 | 56028 | 0.80541485 |
| 10021 | 93 | 56029 | −0.208246564 |
| 10021 | 93 | 56030 | 0.62596653 |
| 10021 | 93 | 56031 | −0.038819315 |
| 10021 | 93 | 56032 | 0.11029697 |
| 10021 | 94 | 56033 | 0.013483197 |
| 10021 | 94 | 56034 | 0.267608507 |

The Set of Companies Participating in this Industry

The products being sold by the advertisers in this industry are often direct competitors. For example, both American Express Gold Card and Chase Sapphire offer Premium, yearly fee credit cards; one at a price point of $165 and the other at $185. These two companies both belong to a premium credit card industry. Power tools companies such as Makita, Boch, etc., are ideally trying to reach amateur handymen and contractors, and belong to the "Power Tools" industry. BMW and Mercedes both sell luxury autos with a similar buying population profile. In general we have made available industries which have clear target profiles, and where we can have confidence that the products being sold are similar enough to compare in this manner.

We next identify competitor companies by looking for a NielsenProduct that matches the target population. For example, for the Power Tools industry, NielsenProduct Name='Power Tools-Access' properly identifies all of the "power tool ads". We then recover the NielsenDivision-Names associated with those ad airings, and we end up with a list of companies including Boch, Positec, Makita and so on.

In most cases, the NielsenProduct and NielsenDivision-Names is sufficient to properly identify the companies selling a particular product. However in some cases we have to create exclusions to avoid picking up some companies that are selling different products to the rest of the industry. In general our product definitions follow Nielsen and cases where have to implement exclusions are not as common. Detailed information on the definitions for every industry are below.

TABLE H

Nielsen product hierarchy table

| Nielsen Product Hierarchy ID | Nielsen Product Hierarchy Name | Nielsen Ad Occurrence Column Name |
|---|---|---|
| 1 | Industry | NielsenProductIndustryCategoryName |
| 2 | Major Category | NielsenProductMajorCategoryName |
| 3 | Sub-Group Category | NielsenProductCategoryName |
| 4 | Parent Company | NielsenCompanyName |
| 5 | Product Category | NielsenProductName |
| 6 | Subsidiary | NielsenDivisionName |
| 7 | Brand | NielsenBrandName |
| 8 | Brand Variant | NULL |
| 9 | Creative | NULL |

In terms of technical implementation, we actually decompose all of the above NielsenProduct definitions into Nielsen's lowest level classification which is NielsenBrandName, and we use the collection of NielsenBrandNames to identify all airings belonging to the companies in the industry.

The database schema which represents industry definitions is below:

TABLE I

Identifier mappings to each iobid (industry). For example, "Weight Loss Program" found at Nielsen hierarchy level 4 (NielsenCompanyName) maps to 3 which is an advertiser industry for "Diet". The above table also shows a special "exclude" directive - when exclude = 1, instead of including when the above string is detected at the appropriate level of the hierarchy, any airings are excluded. PanelID refers to the "airing source" which is the source of the airings that are being sampled. For example, Nielsen Monitorplus may be 11, and BVS Verified airings may be 9. Civolution may be 13.

| Job ID | Identifier Name | Panel ID | Nielsen Product Hierarchy ID | Exclude |
|---|---|---|---|---|
| 1 | Charitable Orgn | 6 | 5 | 0 |
| 1 | Charitable Orgn | 11 | 5 | 0 |

TABLE I-continued

Identifier mappings to each iobid (industry). For example, "Weight Loss Program" found at Nielsen hierarchy level 4 (NielsenCompanyName) maps to 3 which is an advertiser industry for "Diet". The above table also shows a special "exclude" directive - when exclude = 1, instead of including when the above string is detected at the appropriate level of the hierarchy, any airings are excluded. PanelID refers to the "airing source" which is the source of the airings that are being sampled. For example, Nielsen Monitorplus may be 11, and BVS Verified airings may be 9. Civolution may be 13.

| Job ID | Identifier Name | Panel ID | Nielsen Product Hierarchy ID | Exclude |
|---|---|---|---|---|
| 3 | EDIETS.COM INC | 6 | 4 | 1 |
| 3 | EDIETS.COM INC | 11 | 4 | 1 |
| 3 | NUTRI/SYSTEM INC | 6 | 4 | 1 |
| 3 | NUTRI/SYSTEM INC | 11 | 4 | 1 |
| 3 | PERSONAL ENHANCEMENT & NUTRITION | 6 | 4 | 1 |
| 3 | PERSONAL ENHANCEMENT & NUTRITION | 11 | 4 | 1 |
| 3 | RODALE INC | 6 | 4 | 1 |
| 3 | RODALE INC | 11 | 4 | 1 |
| 3 | THIN FOR LIFE-3L | 6 | 4 | 1 |
| 3 | THIN FOR LIFE-3L | 11 | 4 | 1 |
| 3 | Weight Loss Program | 6 | 5 | 0 |

TABLE I-continued

Identifier mappings to each iobid (industry). For example, "Weight Loss Program" found at Nielsen hierarchy level 4 (NielsenCompanyName) maps to 3 which is an advertiser industry for "Diet". The above table also shows a special "exclude" directive - when exclude = 1, instead of including when the above string is detected at the appropriate level of the hierarchy, any airings are excluded. PanelID refers to the "airing source" which is the source of the airings that are being sampled. For example, Nielsen Monitorplus may be 11, and BVS Verified airings may be 9. Civolution may be 13.

| Job ID | Identifier Name | Panel ID | Nielsen Product Hierarchy ID | Exclude |
|---|---|---|---|---|
| 3 | Weight Loss Program | 11 | 5 | 0 |
| 9 | Power Tools-Access | 6 | 5 | 0 |
| 9 | Power Tools-Access | 11 | 5 | 0 |

TABLE J columns 1-4

| AiringID | SourceSegmentKey | JobID | ProgramName |
|---|---|---|---|
| 888006999 | 10023 | 9 | PARDON THE INTERRUPTION |
| 888007000 | 10023 | 9 | SPEEDERS |
| 888007001 | 10023 | 9 | GHOST ADVENTURES |
| 888007002 | 10023 | 9 | TSG PRESENTS |
| 888007003 | 10023 | 9 | AMER FUNNIEST HOME VIDEOS |
| 888007004 | 10023 | 9 | NFL TOTAL ACCESS |
| 888007005 | 10023 | 9 | MONSTERS AND MYSTERIES IN |
| 888007006 | 10023 | 9 | NASCAR NOW |
| 888007007 | 10023 | 9 | NASCAR NOW L |
| 888007008 | 10023 | 9 | WORLDS DEADLIEST AIRCRAFT |

TABLE J columns 5-11

| AirDate | TRatio | Impressions | Cost | CPM | Hour of Day | Day of Week |
|---|---|---|---|---|---|---|
| 3/26/10 6:11 PM | 0.190413 | 178082 | 1229.5137 | 6.9042 | 18 | 6 |
| 3/26/10 3:38 AM | −0.04392 | 159304 | 308.3488 | 1.9356 | 3 | 6 |
| 3/25/10 10:51 PM | −0.08661 | 236204 | 1184.9174 | 5.0165 | 22 | 5 |
| 3/25/10 10:20 PM | −0.00398 | 395340 | 1189.5484 | 3.00893 | 22 | 5 |
| 3/25/10 9:31 PM | 0.159927 | 92704 | 192.2588 | 2.0739 | 21 | 5 |
| 3/26/10 10:10 AM | 0.009535 | 67577 | 272.3167 | 4.02973 | 10 | 6 |
| 3/26/10 12:09 AM | 0.117099 | 440801 | 3069.1651 | 6.9627 | 0 | 6 |
| 3/30/10 2:13 AM | 0.204627 | 141522 | 746.5887 | 5.27543 | 2 | 3 |
| 4/20/10 5:24 PM | 0.196591 | 141522 | 748.8177 | 5.29117 | 17 | 3 |
| 4/20/10 9:07 AM | 0.373725 | 82770 | 158.0679 | 1.90972 | 9 | 3 |

TABLE J columns 12-19: Each record of the above table represent a television airing. The television airing was sampled for jobid = 9 in the example above (Power Tools). The airing includes the datetime, program name (program mastered), station that it aired on (station mastered), pod position in which it aired, and so on. The above television spots are then analyzed for their audience, and a relevance score is calculated based on the match between the advertiser's product purchasers and the audience of the airings above.

| Market Master ID | Station Master ID | Program Master ID | Match Failure | Panel Airing ID | Pod Group Number | Pod Position Number | Max Pod Position Number |
|---|---|---|---|---|---|---|---|
| 169 | 97 | 2315 | 0 | 5904169 | 1 | 3 | 5 |
| 169 | 752 | 59624 | 0 | 5903413 | 1 | 2 | 7 |
| 169 | 751 | 15812 | 0 | 3656474 | 5 | 4 | 6 |
| 169 | 752 | 116878 | 0 | 5907195 | 2 | 4 | 10 |
| 169 | 952 | 3492 | 0 | 5906317 | 3 | 6 | 7 |
| 169 | 684 | 2405 | 0 | 5904148 | 4 | 1 | 9 |
| 169 | 86 | 17865 | 0 | 5904162 | 1 | 1 | 4 |
| 169 | 97 | 2261 | 0 | 5904874 | 1 | 2 | 6 |
| 169 | 97 | 2261 | 0 | 5906735 | 3 | 3 | 7 |
| 169 | 670 | NULL | 1 | 3420817 | 1 | 3 | 5 |

Example Industry 1: Power Tools Industry

Advertiser Definition

The Power Tools industry is defined as all NielsenDivisionName companies that are listed under NielsenProductName='Power Tools-Access' by Nielsen Corporation. 16 NielsenDivisionNames are listed ranging from Sears Roebuck & Co to Makita USA.

The products that are sold under these headings are shown in FIG. 2. There are 68 products defined ranging from DREMEL 400 SERIES XPR POWER TOOLS-ACCESS to ROCKWELL BLADERUNNER POWER TOOLS-ACCESS.

Buyer Target Definition

Let us assume that we have 112,233 persons who have bought power tools, ranging from oscillating tools, to cutting tools, drills, and workbench stands. The product counts are shown below

TABLE K

Power tools buyers that are being used for targeting

| sourcekey | Sourcecompanyname | persons |
|---|---|---|
| 10023 | Saw stand | 48421 |
| 10036 | Oscillating tool | 20946 |
| 10084 | Cutting tool | 13668 |
| 110088 | Oscillating tool | 9839 |
| 110115 | Drills | 5879 |
| 110116 | Other General Handyman tools | 13480 |
| Total | | 112,233 |

TABLE L

NielsenDivisions detected in the Power Tools industry

| JobID | NielsenDivisionName | Cost | CostRank | Impressions |
|---|---|---|---|---|
| 9 | SEARS ROEBUCK & CO | 6448305 | 1 | 1124061344 |
| 9 | POSITEC USA INC | 6331959 | 2 | 1180631424 |
| 9 | ROBERT BOSCH TOOL CORP | 1258700 | 3 | 313894224 |
| 9 | HOME DEPOT INC | 802951 | 4 | 145449808 |
| 9 | ECHO INC | 626752 | 5 | 89720848 |
| 9 | RYOBI TOOLS INC | 376469 | 6 | 63577136 |
| 9 | BLACK & DECKER CORP | 164736 | 7 | 30052512 |
| 9 | MOTHERS POLISHES-WAXES-CLEANERS INC | 153516 | 8 | 28104272 |
| 9 | STIHL INC | 135574 | 9 | 24437504 |
| 9 | OREGON CUTTING SYSTEMS DV OF BT INC | 97883 | 10 | 16301600 |
| 9 | FEIN POWER TOOLS INC | 74861 | 11 | 22792112 |
| 9 | PORTER-CABLE CORP | 59889 | 12 | 4954656 |
| 9 | BSH HOME APPLIANCES CORP | 18269 | 13 | 5165104 |
| 9 | MAKITA USA INC | 5282 | 14 | 974400 |
| 9 | LARRY HESS & ASSOC INC | 4334 | 15 | 1176336 |
| 9 | GUARDAIR CORP | 770 | 16 | 146720 |

TABLE M

Top Demographic variables for power tool buyers

| Variable d | Value v | Z-score $P_{d,v}^+$ |
|---|---|---|
| Off-Road Recreational Vehicles | True | 3.396183 |
| DIY Living | True | 1.787005 |
| Personicx Classic | Country Ways | 1.748729 |
| Home Improvement - DIYer | True | 1.336364 |
| Woodworking | True | 1.258405 |
| Hunting | True | 1.180173 |
| Personicx Classic | The Great Outdoors | 1.167606 |
| Military Memorabilia, Weaponry | True | 1.107564 |
| Personicx Classic | Full Steaming | 1.080662 |
| Personicx Classic | Acred Couples | 1.068328 |
| Science, Space | True | 1.01155 |
| Personicx Classic | Rural Retirement | 1.008405 |
| Motorcycling | True | 0.956336 |
| Auto Parts and Accessories | True | 0.911406 |
| DOB - Year | Born in the 1940s | 0.908301 |
| Motorcycle Owner | True | 0.903744 |
| Crafts, Hobbies Interest | True | 0.870761 |

Example Industry 2: Charity Industry

Advertiser Definition

The Charity industry is defined as all companies that are advertising with brands that are within NielsenProductName='Charitable Orgn'.

TABLE N

| JobID | NielsenDivisionName | Cost | CostRank |
|---|---|---|---|
| 1 | MCDONALDS CORP | 8582700 | 1 |
| 1 | AMERICAN CANCER SOCIETY INC | 8028839.5 | 2 |
| 1 | AMERICAN SOCT PRVNT CRLTY ANMLS INC | 5584664.9962671 | 3 |
| 1 | CHILDFUND ALLIANCE | 4175138.270236 | 4 |
| 1 | HUMANE SOCIETY OF THE US | 2909849.9999254 | 5 |
| 1 | JUVENILE DIABETES RESEARCH FNDN | 2332250 | 6 |
| 1 | TELETON USA | 2239296 | 7 |
| 1 | SALVATION ARMY | 2197725.5 | 8 |
| 1 | UNITED WAY | 1810961 | 9 |
| 1 | CHILDREN INTL | 1372539 | 10 |
| 1 | ENTERTAINMENT INDUSTRY FNDN | 1347846 | 11 |
| 1 | ALZHEIMERS DISEASE RTD DSR ASSN INC | 1139313 | 12 |

TABLE N-continued

| JobID | NielsenDivisionName | Cost | CostRank |
|---|---|---|---|
| 1 | PARTNERSHIP FOR A DRUG-FREE AMERICA | 1118875.5 | 13 |
| 1 | PRODUCE FOR BETTER HEALTH FNDN INC | 1115152 | 14 |
| 1 | AVON PRODUCTS INC | 1021685 | 15 |
| 1 | PARTNERSHIP AT DRUGFREE.ORG | 999418 | 16 |
| 1 | DKMS AMERICAS | 997697 | 17 |
| 1 | AMERICAN HEART ASSN INC | 950747 | 18 |
| 1 | IRAQ & AFGHANISTN VTRNS OF AMRC INC | 907540.4 | 19 |
| 1 | CHURCH OF SCIENTOLOGY | 827361 | 20 |

Buyer Target Definition

Targeting is using over 409,025 buyers who have donated to a children's charity.

TABLE O

| Sourcekey | SourceCompanyName | Persons |
|---|---|---|
| 110382 | Children's charity | 409,025 |

The top demographics of this group of donors is that they are (a) age 70+, (b) have high incomes, or a large amount of discretionary income, (c) are classified seniors, (d) female.

Top 20 demographic variable-values

TABLE P

| Demographics Name | Demographics Description | Sort | Customer Pct | Index Vs Avg | Variable Value Count |
|---|---|---|---|---|---|
| Luxury SUV - Most Likely to Own | 02 | 2 | 0.146858 | 5.727161 | 18054 |
| Donation, Contribution | True | 1 | 0.356982 | 4.175142 | 48430 |
| DOB - Year | Born Before 1930 | 1 | 0.152037 | 3.62542 | 18472 |
| Discretionary Income | Lower Discretionary Income Index (15-29) | 2 | 0.023693 | 3.257232 | 2910 |
| Investing | True | 1 | 0.263502 | 3.132852 | 35748 |
| Audio Books and Music | True | 1 | 0.021457 | 2.894037 | 2911 |
| Personicx Classic | Suburban Seniors | 28 | 0.059221 | 2.875299 | 7764 |
| Health - Cholesterol Focus | True | 1 | 0.11067 | 2.772138 | 15014 |
| Young Men's Apparel | True | 1 | 0.025172 | 2.73263 | 3415 |
| Petite Women's Apparel | True | 1 | 0.106579 | 2.729189 | 14459 |
| Age | 76+ | 99 | 0.259985 | 2.555719 | 31628 |
| Personicx Classic | Timeless Elders | 66 | 0.019542 | 2.316139 | 2562 |
| Income | Greater than $500K | 13 | 0.024712 | 2.097285 | 3038 |
| Personicx Classic | Devoted Duos | 49 | 0.038382 | 2.068783 | 5032 |
| Senior Needs Interest | True | 1 | 0.023167 | 2.047854 | 3143 |
| Infants and Toddler Apparel | True | 1 | 0.057848 | 1.89106 | 7848 |
| Occupation - Professional | Legal/Attorney/Lawyer | 15 | 0.026331 | 1.662399 | 1075 |
| Income Range Premium | $400-500K | 23 | 0.009111 | 1.658248 | 1120 |
| Female 75+ | True | 1 | 0.223079 | 1.646957 | 30264 |
| Income | $300-500K | 12 | 0.017668 | 1.61112 | 2172 |

What is claimed is:

1. A method of recommending television ad placement for multiple advertisers, the method comprising:

calculating, by the processor, a cost ratio for each program among the plurality of programs as a cost per targeted impression divided by a calculated first relevance of each advertising target among a plurality of advertising targets for the respective program;

calculating, by the processor, a second relevance of an advertising target associated with the respective program; and generating, by the processor, recommendations for an advertising target among the plurality of advertising targets based on the calculated first relevance of each advertising target, the calculated second relevance of the associated advertising target, and the calculated cost ratio.

2. The method of claim 1, further comprising:

calculating, by the processor, the first relevance based on a first correlation coefficient between demographic attributes of product purchasers among the plurality of advertising targets and demographic attributes of viewing persons viewing the program.

3. The method of claim 1, wherein calculating the second relevance of the advertising target associated with the respective program is based on a second correlation coefficient between demographic attributes of the product purchasers among the plurality of advertising targets and demographic attributes of the viewing persons viewing the respective program.

4. The method of claim 1, wherein generating the recommendations comprises sorting each program by the calculated cost ratio and selecting the program having the smallest calculated cost ratio as a target program.

5. The method of claim 4, wherein generating the recommendations further comprises sorting each identified program by the calculated first relevance of the advertising target and selecting the identified program having the greatest calculated first relevance as an additional target program.

6. The method of claim 1, wherein generating the recommendations comprises sorting each advertiser industry by the calculated first relevance of the identified program and selecting the advertising target having the greatest calculated first relevance as the advertising target.

7. The method of claim 4, further comprising:
identifying available programs among the identified programs,
wherein the generating recommendations further comprises sorting each identified available program by the calculated first relevance of the advertising and selecting the identified available program having the greatest calculated first relevance as an additional target program.

8. The method of claim 4, further comprising:
for each identified program, calculating an increased relevance as the difference between the calculated first relevance of advertising target for the identified program and the calculated second relevance of the determined advertisement for the identified program,
wherein generating the recommendations further comprises sorting the identified programs by the calculated increased relevance and selecting the identified program having the greatest calculated increased relevance as an additional target program.

9. A system for recommending television ad placement for multiple advertisers, the system comprising:
a server providing program information for a respective identified program aired in each media slot among a plurality of media slots over a network, the program information including viewing data of a plurality of viewing persons viewing the program; and
an advertising targeting controller configured to:
calculate a cost ratio for each program among the plurality of programs as a cost per targeted impression divided by a calculated first relevance of each advertising target among a plurality of advertising targets for the respective program;
calculate a second relevance of an advertising target associated with the respective program; and
generate recommendations for an advertising target among the plurality of advertising targets based on the calculated first relevance of each advertising target, the calculated second relevance of the associated advertising target, and the calculated cost ratio.

10. The system of claim 9, wherein the advertising targeting controller is further configured to:
calculate, by the processor, the first relevance based on a first correlation coefficient between demographic attributes of product purchasers among the plurality of advertising targets and demographic attributes of viewing persons viewing the program,
wherein calculating the second relevance of the advertising target associated with the respective program is based on a second correlation coefficient between demographic attributes of the product purchasers among the plurality of advertising targets and demographic attributes of the viewing persons viewing the respective program.

11. The system of claim 9, wherein generating the recommendations comprises sorting each program by the calculated cost ratio and selecting the program having the smallest calculated cost ratio as a target program.

12. The system of claim 9, wherein generating the recommendations comprises sorting each advertiser industry by the calculated first relevance of the identified program and selecting the advertising target having the greatest calculated first relevance as the advertising target.

13. The system of claim 11, wherein the advertising targeting controller is further configured to:
identify available programs among the identified programs, and
wherein generating the recommendations further comprises sorting each identified available program by the calculated first relevance of the advertising target and selecting the identified available program having the greatest calculated first relevance as an additional target program.

14. The system of claim 11, wherein the advertising targeting controller is further configured to:
for each identified program calculate an increased relevance as the difference between the calculated first relevance of advertising target for the identified program and the calculated second relevance of the determined advertisement for the identified program, and
wherein generating the recommendations further comprises sorting the identified programs by the calculated increased relevance and selecting the identified program having the greatest calculated increased relevance as an additional target program.

15. A non-transitory computer readable medium storing a program causing a computer to execute a method of recommending television ad placement for multiple advertisers, the method comprising:
calculating, by the processor, a cost ratio for each program among the plurality of programs as a cost per targeted impression divided by a calculated first relevance of each advertising target among a plurality of advertising targets for the respective program;
calculating, by the processor, a second relevance of an advertising target associated with the respective program; and
generating, by the processor, recommendations for an advertising target among the plurality of advertising targets based on the calculated first relevance of each advertising target, the calculated second relevance of the associated advertising target, and the calculated cost ratio.

16. The non-transitory computer readable medium according to claim 15, the executed method further comprising:
calculating, by the processor, the first relevance based on a first correlation coefficient between demographic attributes of product purchasers among the plurality of advertising targets and demographic attributes of viewing persons viewing the program,
wherein calculating the second relevance of the advertising target associated with the respective program is based on a second correlation coefficient between demographic attributes of the product purchasers among the plurality of advertising targets and demographic attributes of the viewing persons viewing the respective program.

17. The non-transitory computer readable medium according to claim 15, wherein generating the recommendations comprises sorting each program by the calculated cost ratio and selecting the program having the smallest calculated cost ratio as a target program.

18. The non-transitory computer readable medium according to claim 17, wherein generating the recommendations further comprises sorting each identified program by the calculated first relevance of the advertising target and selecting the identified program having the greatest calculated first relevance as an additional target program.

19. The non-transitory computer readable medium according to claim 15, wherein generating the recommendations comprises sorting each advertising target by the calculated first relevance of the identified program and selecting the advertising target having the greatest calculated first relevance as the advertising target.

20. The non-transitory computer readable medium according to claim 17, the executed method further comprising:
- for each identified program calculating an increased relevance as the difference between the calculated first relevance of advertising target for the identified program and the calculated second relevance of the determined advertisement for the identified program,
- wherein generating the recommendations further comprises sorting the identified programs by the calculated increased relevance and selecting the identified program having the greatest calculated increased relevance as an additional target program.

* * * * *